(12) United States Patent
Buckingham et al.

(10) Patent No.: US 7,061,393 B2
(45) Date of Patent: Jun. 13, 2006

(54) SYSTEM AND METHOD FOR MANAGING SERVICES AND FACILITIES IN A MULTI-UNIT BUILDING

(75) Inventors: Duane W. Buckingham, Old Lyme, CT (US); Richard N. Quirino, East Lyme, CT (US); David G. Oliver, Old Lyme, CT (US); Gregory F. Scheurer, Mystic, CT (US); Philipp A. Roosli, Niantic, CT (US)

(73) Assignee: INNCOM International Inc., Niantic, CT (US)

( * ) Notice: Subject to any disclaimer, the term of this patent is extended or adjusted under 35 U.S.C. 154(b) by 0 days.

(21) Appl. No.: 10/672,712

(22) Filed: Sep. 26, 2003

(65) Prior Publication Data

US 2004/0178889 A1     Sep. 16, 2004

Related U.S. Application Data

(63) Continuation-in-part of application No. 10/029,057, filed on Dec. 20, 2001.

(60) Provisional application No. 60/257,010, filed on Dec. 20, 2000.

(51) Int. Cl.
*G08B 23/00* (2006.01)

(52) U.S. Cl. .............................. 340/693.3; 340/825.22; 340/825.27; 340/501; 340/539.1; 340/571

(58) Field of Classification Search .......... 340/825.31, 340/825.34, 571, 573.1, 501, 539, 328, 693.3, 340/825.22, 825.27, 539.1, 538, 657; 307/38, 307/39, 40, 116; 235/382, 382.5; 700/11, 700/12

See application file for complete search history.

(56) References Cited

U.S. PATENT DOCUMENTS

| | | | |
|---|---|---|---|
| 3,964,058 A | | 6/1976 | Winston |
| 4,523,193 A | | 6/1985 | Levinson et al. |
| 4,727,918 A | * | 3/1988 | Schroeder ..................... 160/5 |
| 5,670,940 A | | 9/1997 | Holcomb et al. |
| 5,675,487 A | * | 10/1997 | Patterson et al. ............. 700/56 |
| 5,774,039 A | | 6/1998 | Housley |
| 5,861,806 A | | 1/1999 | Vories et al. |
| 5,933,085 A | | 8/1999 | Holcomb et al. |
| 6,107,928 A | | 8/2000 | Gatti |
| 6,160,881 A | | 12/2000 | Beyda et al. |
| 6,208,905 B1 | * | 3/2001 | Giddings et al. ............. 700/11 |
| 6,236,303 B1 | | 5/2001 | Wagner et al. |
| 6,359,564 B1 | | 3/2002 | Thacker |
| 6,414,589 B1 | | 7/2002 | Angott et al. |
| 6,700,224 B1 | * | 3/2004 | Biskup et al. .............. 307/116 |

FOREIGN PATENT DOCUMENTS

| | | |
|---|---|---|
| EP | 0802472 | 10/1997 |
| EP | 1154105 | 11/2001 |
| WO | WO02/13218 | 2/2002 |
| WO | WO02/059764 | 8/2002 |
| WO | WO02/060111 | 8/2002 |

* cited by examiner

*Primary Examiner*—Hung Nguyen
(74) *Attorney, Agent, or Firm*—Cantor Colburn LLP

(57) ABSTRACT

The application discloses various methods and systems that utilize infrared communication to enhance and manage the security and convenience of occupants and the operation and efficiency of the staff of a multi-unit building.

59 Claims, 14 Drawing Sheets

SYSTEM AND METHOD FOR MANAGING SERVICES AND FACILITIES IN A MULTI-UNIT BUILDING

CROSS REFERENCE TO RELATED APPLICATIONS

This application is a continuation-in-part of U.S. patent application Ser. No. 10/029,057 filed Dec. 20, 2001, entitled INTELLEGENT DOOR PLATE AND CHIME, which claims priority to U.S. Provisional Application Ser. No. 60/257,010, filed Dec. 20, 2000, which are incorporated by reference.

BACKGROUND OF THE INVENTION

Multi-unit buildings such as hotels, motels, inns, and the like, offer a variety of services and facilities for the convenience of their guests. Guest services typically include maid service, concierge services, in-room dining services, laundry and dry cleaning services, wake-up calls, shoeshine services, butler services, and others. Facilities available for control or access by a guest typically include Heating/Ventilation/Air-Conditioning (HVAC) control units or thermostats, mini-bar, room lighting, door locks, television, alarm clock, radio, telephone, internet access, electronic drapes, and others.

Many modern guest rooms include room control systems. Room control systems is a central control computer or device that receives data from various remote sensors and operates a number of remote room control devices. Such remote sensors include, for example, motion sensors, temperature sensors, smoke detectors, and door and other closure switches. Such remote room control devices include, for example, thermostats and associated relays for heating, ventilation and air conditioning (HVAC) equipment, electronic locks, lighting control switches and relays, and motors and switches for opening and closing drapes. The central control computer uses the data and control devices to, for example, adjust the room's temperature, determine and annunciate whether the room is occupied or unoccupied, determine and annunciate whether the room's mini-bar has been accessed, sound fire and emergency alarms, turn lights on or off, permit or deny access to the room, open and close drapes, turn audio-visual equipment on or off, and perform other functions related to controlling equipment or annunciating status in rooms. A central control computer or device may be located in each room, and all rooms are tied to a single master central control computer. Where a central control computer or device is used in each room, each such computer or device provides data to the master central control computer from which such data is disseminated to display and control terminals at housekeeping, front desk, security, engineering or any number of other locations in order to provide hotel personnel with access to the data and with the ability to remotely control various room functions or settings from such terminals.

Room control systems are valuable tools for the lodging industry. Unfortunately, the equipment and installation costs associated with room control systems are generally too expensive for most new construction and renovation projects.

SUMMARY OF THE INVENTION

The above discussed and other drawbacks and deficiencies are overcome or alleviated by an exemplary method of effecting a reduction of energy usage in a room of a multi-unit building, the method includes: determining a vacant occupancy status of the room; generating digital commands in response to the vacant occupancy status of the room; converting the digital commands at a gateway device located inside of the room into infrared commands; transmitting the infrared commands from the gateway device; receiving the infrared commands at a room environment control device located inside of the room; and converting the infrared commands into electronic commands which are processed by the room environmental control device to effect a reduction of energy usage by a room environmental device associated with the room environmental control device.

Another exemplary method includes a method of profiling an occupant's desired environmental settings in a room of a multi-unit building. The method includes: converting electronic data indicative of a setting on a room environmental control device located inside of the room into infrared data; transmitting the infrared data from the room environmental control device; receiving the infrared data at a gateway device located inside of the room; and converting the infrared data into digital data which is processed to generate a profile of the occupant's desired environmental settings.

Another exemplary method includes a method of determining a condition of a mini-bar condition in a room of a multi-unit building. The method includes: detecting an activity at the mini-bar located inside of the room; generating electronic data in response to the activity at the mini-bar; converting the electronic data at the mini-bar into infrared data; transmitting the infrared data from the mini-bar; receiving the infrared data at a gateway device located inside of the room; and converting the infrared data into digital data which is processed to determine the condition of the mini-bar.

Another exemplary method includes a method of detecting a request of an occupant in a room of a multi-unit building. The method includes: converting the request of the occupant from an occupant interface device located inside of the room into infrared data; transmitting the infrared data from the occupant interface device; receiving the infrared data at a gateway device located inside of the room; and converting the infrared data into digital data which is processed to generate the request of the occupant for detection outside of the room.

Another exemplary method includes a method of locating either a staff or a service device within a multi-unit building. The method includes: transmitting infrared data from a staff tracking device or a service tracking device, which identifies the respective device; receiving the infrared data within the multi-unit building; and converting the infrared data into digital data which is processed to determine a location of either the staff or the service device within the multi-unit building.

Another exemplary method includes a method of displaying a request to staff of a multi-unit building. The method includes: transmitting infrared data at gateway device within the room indicative of the request; receiving the infrared data within the room; converting the infrared data into electrical data; and displaying the request to a staff outside the room, in response to the electrical data.

Another exemplary method includes a method of providing a message to an occupant in a room of a multi-unit building. The method includes: transmitting an infrared message from a gateway device located inside of the room, the infrared message indicative of the message to the occupant; receiving the infrared message within the room; converting the infrared message into an electrical message; and providing the message to the occupant in the room in a detectable format, in response to the electrical message.

Another exemplary method includes a method of identifying a staff by an occupant in a room of a multi-unit building. The method includes: transmitting infrared data from a staff identification device indicative of an identity of the staff which the staff identification device is associated with; receiving the infrared data; and converting the infrared data into digital data which is processed to display within the room an identity of the staff.

Another exemplary method includes a method for affecting a state of a door lock device associated with a room of a multi-unit building. The method includes: generating digital commands in response to a determination to affect the state of the door lock device; converting the digital commands at a gateway device located inside of the room into infrared commands; transmitting the infrared commands from the gateway device; receiving the infrared commands at the door lock device; and converting the infrared commands into electronic commands which are processed by the door lock device to effect the state of the door lock device.

In addition, various exemplary systems are shown and discussed. In particular, an exemplary system for effecting a reduction of energy usage in a room of a multi-unit building includes: means for determining a vacant occupancy status of the room to generate digital commands in response thereto; a gateway device located inside of the room for converting the digital commands into infrared commands and transmitting the infrared commands within the room; and a room environment control device located inside of the room, the room environment control device including means for receiving the infrared commands and converting the infrared commands into electronic commands which are processed to effect a reduction of energy usage by a room environmental device associated with the room environmental control device.

Another exemplary system includes a system for profiling an occupant's desired environmental settings in a room of a multi-unit building. The system includes: a room environment control device located inside of the room, the room environment control device including means for converting electronic data indicative of a setting on a room environmental control device located inside of the room into infrared data and transmitting the infrared data from the room environmental control device; a gateway device located inside of the room for receiving the infrared data at a gateway device located inside of the room and converting the infrared data into digital data; and means for processing the digital data to generate a profile of the occupant's desired environmental settings.

Another exemplary system includes a system for determining a condition of a mini-bar condition in a room of a multi-unit building. The system includes: means for detecting an activity at the mini-bar located inside of the room to generate electronic data in response to the activity at the mini-bar; means for converting the electronic data at the mini-bar into infrared data and transmitting the infrared data from the mini-bar; and a gateway device located inside of the room for receiving the infrared data and converting the infrared data into digital data which is processed to determine the condition of the mini-bar.

Another exemplary system includes a system for detecting a request of a guest in a room of a multi-unit building. The system includes: a guest interface device located inside of the room, the guest interface device including means for converting the request of the guest into infrared data and transmitting the infrared data; a gateway device located inside of the room for receiving the infrared data and converting the infrared data into digital data which is processed to generate the request of the guest; and means for detecting outside of the room by a staff of the multi-unit building the request of the guest.

Another exemplary system includes a system for locating either a staff or a service device within a multi-unit building. The system includes: means for transmitting infrared data from either a staff tracking device or a service tracking device, which identifies the device; means for receiving the infrared data within the multi-unit building; and means for converting the infrared data into digital data which is processed to determine a location of either the staff or the service device within the multi-unit building.

Another exemplary system includes a system for displaying a request to staff of a multi-unit building. The system includes: means for transmitting infrared data at gateway device within the room indicative of the request; means for receiving the infrared data within the room; means for converting the infrared data into electrical data; and means for displaying the request to a staff outside the room, in response to the electrical data.

Another exemplary system includes a system for providing a message an occupant in a room of a multi-unit building. The system includes: a gateway device located inside of the room for transmitting an infrared message indicative of the message to the occupant; means for receiving the infrared message within the room and converting the infrared message into an electrical message; and means for providing the message to the occupant in the room in a detectable format, in response to the electrical message.

Another exemplary system includes a system for identifying a staff by an occupant in a room of a multi-unit building. The system includes: means for transmitting infrared data from a staff identification device indicative of an identity of the staff which the staff identification device is associated with; and means for receiving the infrared data and converting the infrared data into digital data which is processed to display within the room an identity of the staff.

Another exemplary system includes a system for affecting a state of a door lock device associated with building. The system includes: a gateway device located inside of the room for converting digital commands into infrared commands and transmitting the infrared commands within the room, the digital commands generated in response to a determination to affect the state of the door lock device; and the door lock device including means for receiving the infrared commands and converting the infrared commands into electronic commands which are processed to effect the state of the door lock device.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 1:
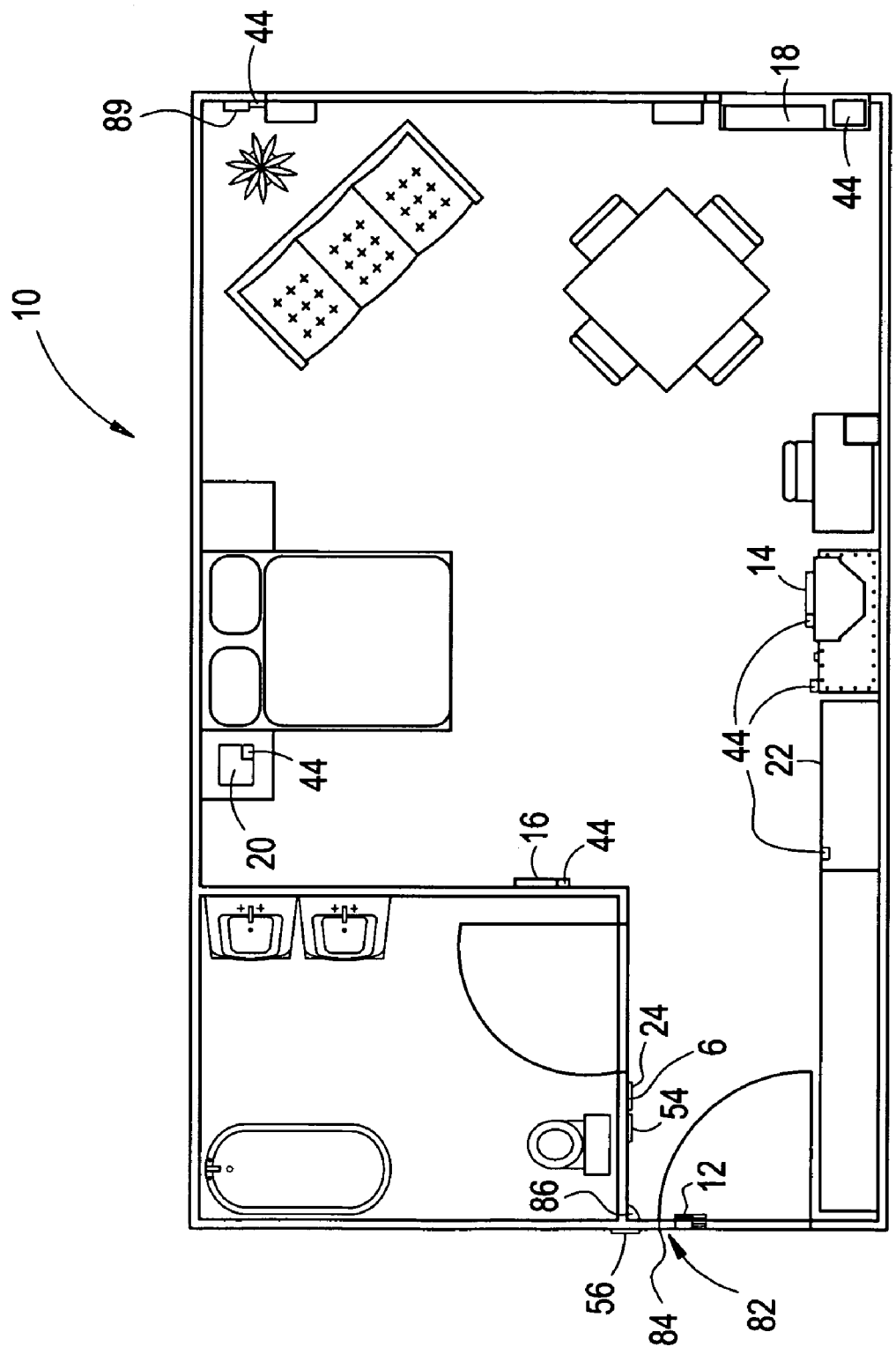
FIG. 1 is a top sectional view of a room showing the installation of room control devices.

FIG. 1 shows an exemplary room 10 of a multi-unit building, the room including a number of room control devices enhancing the security and convenience of occupants, and the operating efficiency of the staff or the multi-unit building. Multi-unit building includes hotels, motels, inns, dormitories, cooperatives, apartments, condominiums, and the like, that offer a variety of services and facilities for the convenience of their guests or residents (occupants). A gateway module 6 that includes an infrared transceiver is provided within the room. The gateway module communicates with other room control devices via infrared communication. For example, room control devices include a door lock (a Central Electronic Lock System (CELS) device) 12, a television set box top 14, a thermostat 16, and/or a heating/air conditioning unit 18, a telephone 20 and a mini-bar 22, each including electronic controls and a transceiver/transmitter module 44 allowing one- or two-way communication with the gateway module 6. Heating/air conditioning units 18 may include a Fan Coil Unit (FCU), a Packaged Terminal Air Conditioner (PTAC) or other Heating, Ventilation, and Air Conditioning (HVAC) system. Room control devices may also include an Energy Management System (EMS) device, a Direct Digital Control (DDC) system device, and other electronic devices typically found in rooms or units of a multi-unit building.

A Packaged Terminal Air Conditioner (PTAC) is an air conditioner/heater unit that extends through an exterior wall of the building. The Fan Coil Unit (FCU) controls ventilation for heating and cooling the room. An Energy Management System (EMS) device is a component in a system that digitally controls a heating, ventilation, and/or air conditioning system associated with the room and which may include a digitally controlled thermostat.

One example of an EMS is the e4™ Energy Management System commercially available from Inncom International, Inc. of Niantic, Conn. A minibar monitoring device is a device that indicates whether or when the minibar in room has been accessed and may indicate which consumable items have been removed. One example of a minibar monitoring device is a minibar door switch such as a model S541 door switch commercially available from Inncom International, Inc; another example is a minibar with built in monitoring capabilities commercially available from Bartech Systems Corporation of Millersville, Md.

A direct digital control (DDC) system device is a component in a system that allows an occupant to remotely control lamps and lights, window draperies, television, or other appliances. DDC devices may include, for example: a model L208 lamp control module commercially available from Inncom International, Inc; a motorized window drapery system such as those commercially available from the Makita, BTX, or Silent Gliss companies; an infrared television remote control; and a model P564 Do Not Disturb/Make Up Room plate commercially available from Inncom International, Inc.

A central electronic lock system (CELS) device is a component in a system for locking and unlocking an access door to the room. CELS devices may include, for example, a model K594 Infrared Transceiver, which is commercially available from Inncom International, Inc., and infrared capable room door locks commercially available from such companies as TimeLox, Sargent, Safelok, and VingCard.

Any of these devices may be controlled or queried remotely via access to the local area network without difficult wiring or configuration of room 10. The modules 44 utilize a diffuse infrared dispersion that allows the transceivers to communicate around corners within the room such that the devices need not be in each other's line of sight, as exemplified in FIG. 1. Gateway module 6 may be incorporated into any one of the aforementioned devices or may be a standalone device located within the room.

Figure 2A:
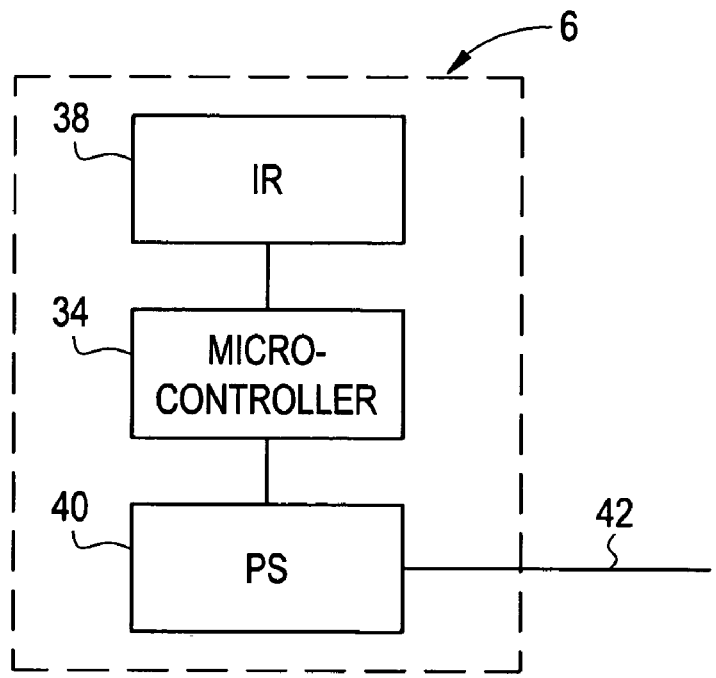
FIG. 2A is a front view of a gateway module of FIG. 1.
Figure 18:
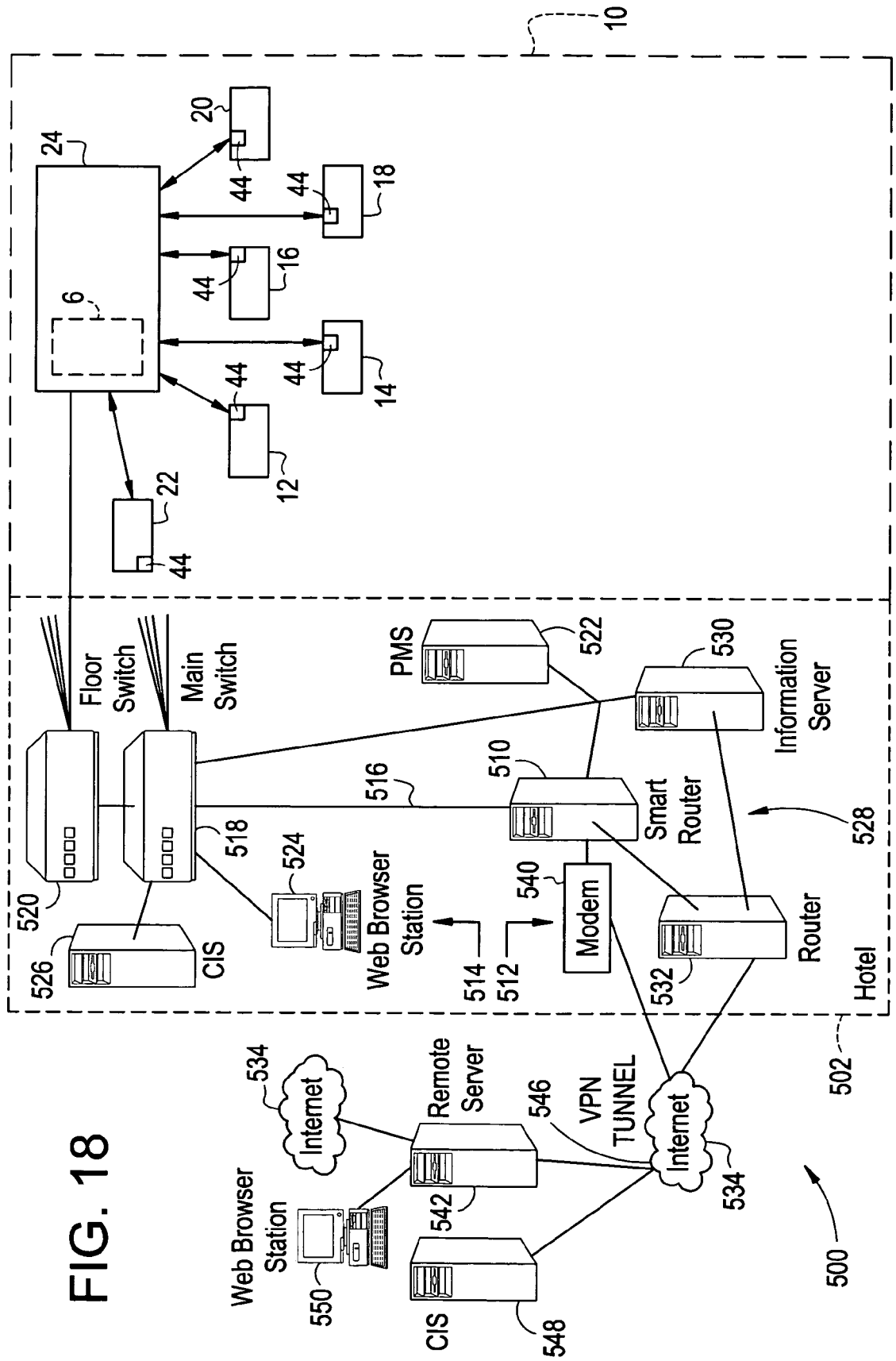
FIG. 18 is a centralized occupant room control system or network.

Referring to FIG. 2A, gateway module 6 includes a microcontroller 34 having associated memory, i.e., random access memory (working memory) and non-volatile memory (boot-code and programming instructions) and an interface for providing data communication with a central floor switch 520 (FIG. 18). An infrared transceiver 38 is connected to microcontroller 34 for providing infrared communication. Gateway module 6 is powered by a power regulator or supply 40 connected to line power 42, although gateway module 6 may be directly powered from an appropriate low voltage line (whereby the power regulator 40 could be eliminated). While a microcontroller is described as having integrated elements, it will be appreciated that the memory and interface could be discrete elements, as is well known in the art. Also, microcontroller may alternatively comprise a microprocessor, a programmable logic device (PLD), a programmable logic array (PLA), a programmable logic controller (PLC) or other suitable device, each being well known in the art and the configuration of each being readily apparent to one skilled in the art.

Gateway module 6 communicates over the LAN in a suitable protocol (e.g., TCP/IP or UDP/IP) that is compatible with central floor switch 520 (FIG. 18). Gateway module 6 communicates with other room control devices via infrared communication in a suitable protocol that is compatible with the room control devices. For example, the infrared communication protocol described in U.S. Pat. No. 5,128,792, which is incorporated herein by reference, may be utilized. Digital iterative gain control such as described in U.S. patent application Ser. No. 10/631,457, entitled Digital Iterative Gain Control, filed Jul. 30, 2003, which is incorporated herein by reference, may also be utilized. Further, the infrared communication protocol may be the IR5 infrared protocol described in the above-referenced applications. Other infrared communication protocols may include IrDA, or the like. It will be appreciated that gateway module 6 may be incorporated in any or all of the room control devices described above.

Figure 2B:
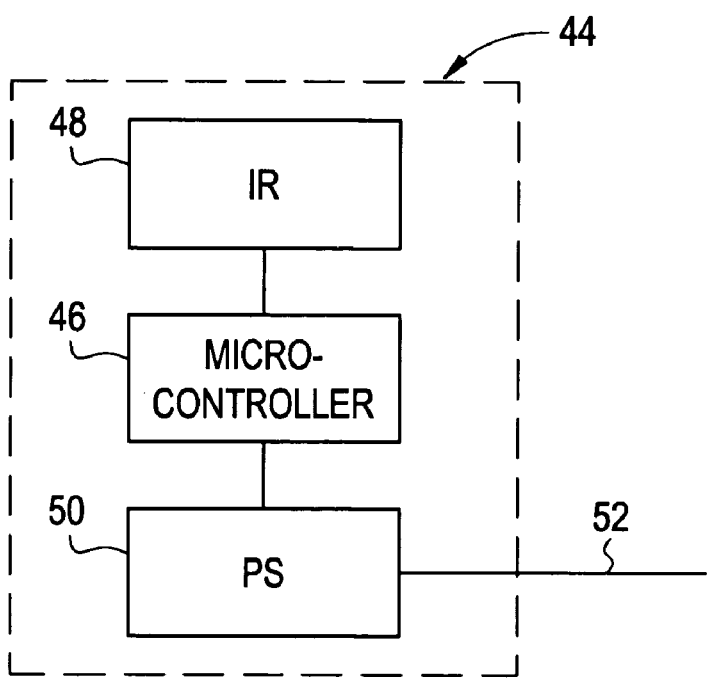
FIG. 2B is a front view of a transceiver/transmitter module of FIG. 1.

FIG. 2B illustrates transceiver/transmitter module 44, which can also be used in each of the room control devices. Module 44 is similar to the gateway module (FIG. 2A), except that module 44 is not directly connected to a control system or network 500 (FIG. 18). Module 44 communicates with gateway module 6, which is connected to system 500. Module 44 includes a microcontroller 46 having associated memory, i.e., random access memory and non-volatile memory and an interface for providing data communication with the device itself, in a protocol compatible with the device. An infrared transceiver (and/or transmitter) 48 is connected to microcontroller 46 for proving infrared communication with gateway module 6 via infrared communication in a suitable protocol that is compatible therewith. Power is provided by a power regulator or supply 50 connected to line power 52 or an appropriate low voltage line (whereby the power regulator 50 could be eliminated). In addition, power supply could also contemplate a battery.

The infrared communication protocol may be any suitable infrared protocol such as described hereinbefore.

In order to reduce the costs of wiring, typically, only one of the room control devices acts as gateway module 6 in the room. Because modules 44 do not need to be wired to system 500 (FIG. 18), it is more economical to place modules 44 on each of the room control devices. The room control device that is physically located in the most convenient location is gateway module 6 and is wired to the network while the remaining room control devices with modules 44 communicate via the gateway module 6.

Referring again to FIG. 1, light switch 24 is identified as the most convenient location to wiring (not shown) extending behind the wall at the main entrance to the room. However, such wiring may instead be extended to the interior of the room with the gateway being incorporated in any one of the other room control devices. Also, in retrofitting older buildings the wiring could be extended on the exterior of the building, and in that case, the PTAC may be the most convenient room control device to act as the room gateway. Another possible alternative in retrofitting would be to extend the wiring along ventilation ducts behind the thermostat. The wiring scheme will be dictated by the existing structure or the design of a new (or remoded) structure. In yet another embodiment, the interface for the gateway module 6 is a wireless interface that communicates with a wireless switch (central floor switch 520, FIG. 18), such wireless networks being well known.

Figure 4:
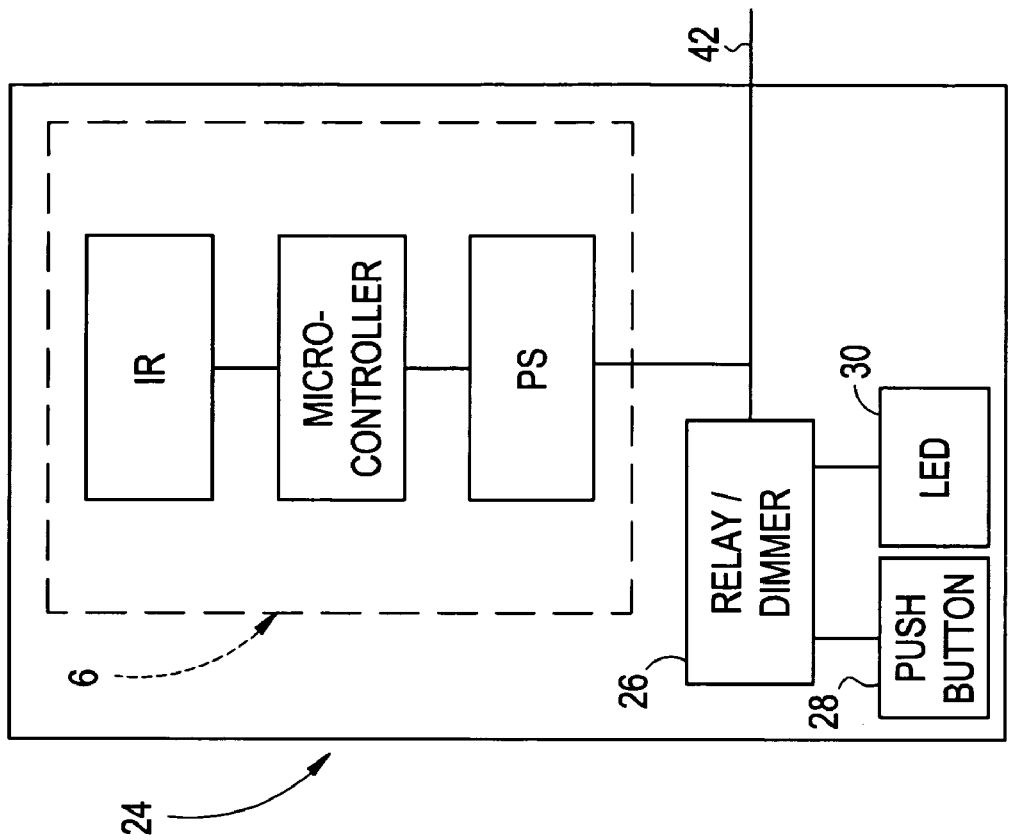
FIG. 4 is a schematic view of the light switch of FIG. 3.
Figure 3:
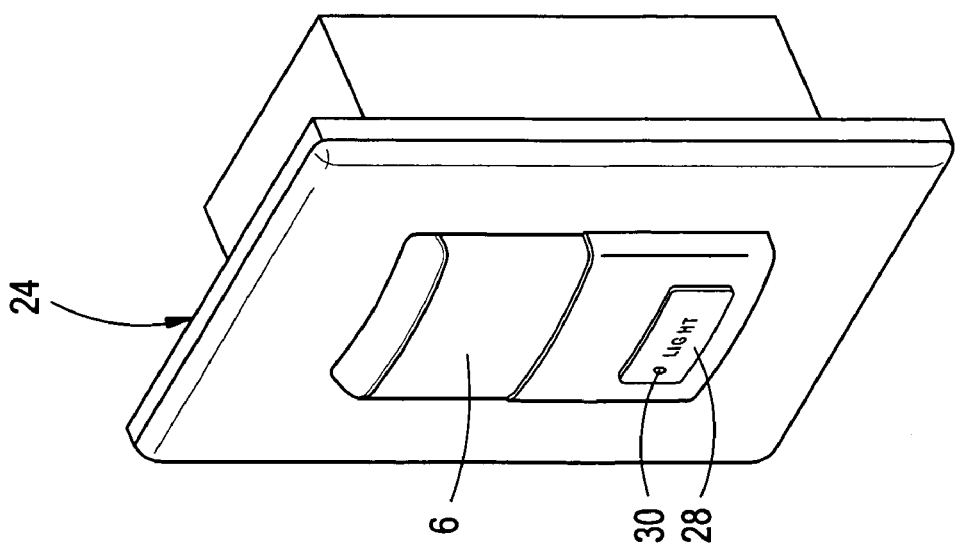
FIG. 3 is a front perspective view of a light switch with the gateway module of FIG. 2A.

Referring to FIGS. 3 and 4, and exemplary embodiment of the invention illustrates gateway module 6 being incorporated into light switch 24. Gateway module 6 is connected to a central switch for the floor or area where the room is located by wiring, (e.g., twisted-pair not shown), i.e., to a Local Area Network (LAN). Alternatively, the gateway could be connected to electrical or telephone wiring for providing communication over such, as communication on such wiring is known.

Light switch 24 serves the dual function of controlling room lighting and acting as gateway module 6 for the room. Light switch 24 is preferably sized to fit in a standard wall junction box (such being well known in the industry and not shown). Light switch 24 houses a relay/dimmer circuit 26, which controls power to a room lamp or other room lighting (not shown). Push button 28 and indicator 30 (e.g. an LED) are connected to relay/dimmer circuit 26 to provide manual control of the room lamp and circuit status, respectively. Indicator 30 may also remain on when the lamp circuit is open to assist in locating button 28 of the light switch when room 10 is dark.

FIGS. 1 and 2B also illustrate a television set top box 14 and telephone 20 with modules 44. These locations would also serve as good locations for gateway modules 6 because both the television set top box 14 and telephone 20 are hardwired.

Referring to FIGS. 1 and 2B, mini-bar 22 is a convenient store of goods within each room, usually within a refrigerator, that can be accessed by the occupant at his or her discretion. Mini-bar 22 includes module 44 for communication with gateway module 6 in the room 10. A mini-bar door switch (not shown) senses the opening and closing of a mini-bar, or a sensor (not shown) internal to the mini-bar for senses depletion of mini-bar stock, this data (or information) is transmitted by infrared transceiver 48 of module 44 to gateway module 6 in the room 10. Typically, the mini-bar is re-stocked after the occupant checks out, and the occupant is billed for the items that he or she consumed. Server 526 (FIG. 18) executes programming instructions to determine if restocking of the mini-bar is required, e.g., the mini-bar door has been opened indicating that items may have been removed and/or the sensor indicates that items may have been removed.

Referring again to FIG. 1, a doorbell chime and switch assembly 54 is located within the room, in this example, in close proximity to the room entrance door for ease of wiring with a doorbell button and annunciation assembly 56 located outside of the room (also in close proximity to the entrance door of the room). Doorbell chime and switch assembly 54 and doorbell button and annunciation assembly 56 are of the types discussed in U.S. patent application Ser. No. 10/029,057, filed Dec. 20, 2001, entitled Intelligent Door Plate and Chime, which is incorporated herein by reference. Assemblies 54 and 56 are powered by a power regulator or supply (not shown) connected to electrical power lines within the hotel, batteries located in one or both of the assemblies, or power taken from the LAN wiring.

Figure 5:
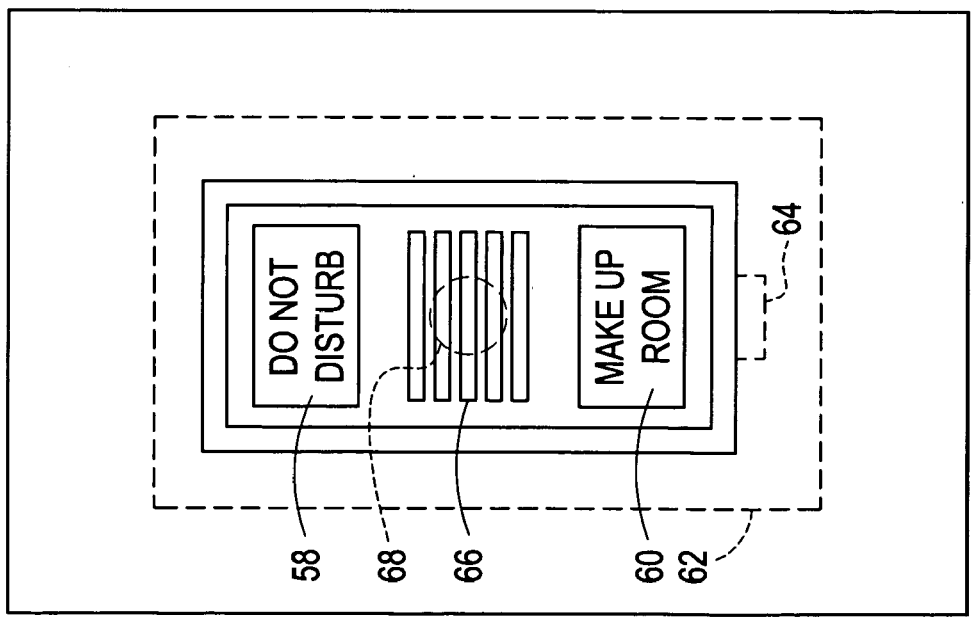
FIG. 5 is a front view of a doorbell chime and switch assembly of FIG. 1.

Referring to FIGS. 1 and 5, doorbell chime and switch assembly (plate) 54 includes a "Do Not Disturb" (DND) 58 and a "Make Up Room" (MUR) 60 push buttons (or switches) supported by a housing 62. Assembly 54 includes circuitry and a connector 64 disposed within housing 62. Alternatively, if assembly 54 is not hardwired through connector 64, assembly 54 would include a transceiver/transmitter module 44 to communicate to gateway module 6 (FIG. 1). This would contemplate that gateway module 6 is located in a room control device that is not light switch 24. Each of push button 58 and 60 is backlit by an LED (not shown) that lights when that button function is active (e.g., when the button 58 or 60 is depressed). A grill 66 is provided in the front face of assembly 54 in between DND and MUR buttons 58 and 60, with a chime speaker 68 disposed behind the grill 66 to provide for connecting assembly 54 with assembly 56 and light switch 24. Doorbell chime and switch assembly 54 is secured to a standard, single gang junction box (not shown) mounted directly on a wall stud or, as in the present example, mounted in a multi-gang junction box (not shown) together with entry light switch 24 (FIG. 1).

Figure 6:
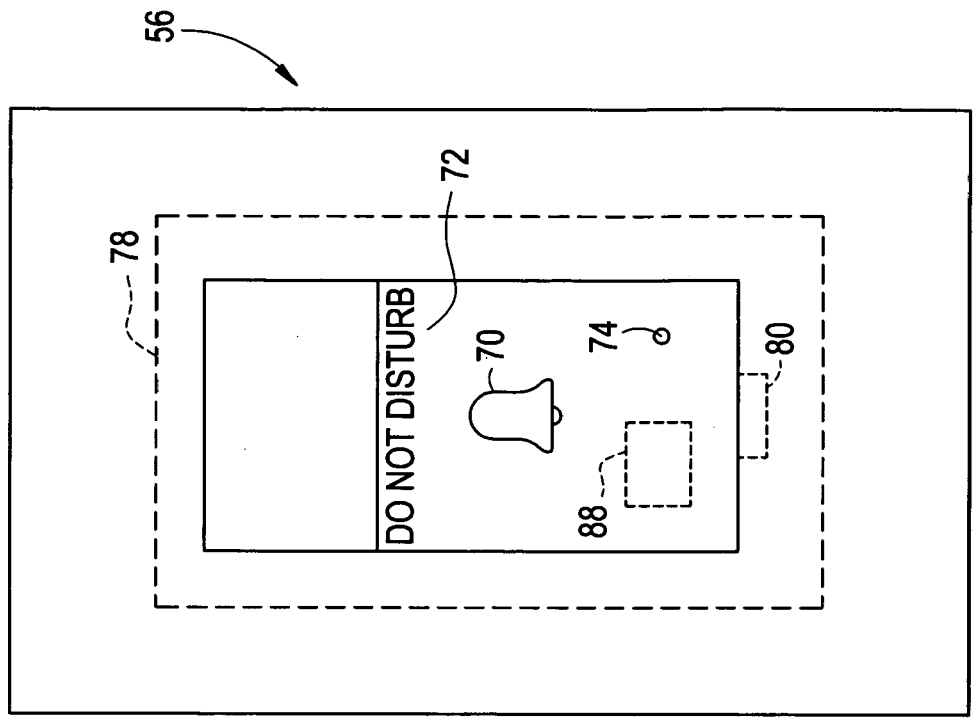
FIG. 6 is a front view of a doorbell button and annunciation assembly of FIG. 1.

Referring to FIGS. 1 and 6, doorbell button and annunciation assembly (plate) 56 is illustrated. Doorbell button and annunciation assembly 56 may also include a room number displayed thereon or a separate room number plate may be provided. Doorbell button and annunciation assembly 56 includes a doorbell button 70, a DND backlit legend 72, preferably backlit in red, a MUR single point light emitting diode (LED) 74, and a hidden switch 76, which may be either mechanically or magnetically queried, supported by a housing 78. Assembly 56 included circuitry and a connector 80 disposed within housing 78 to provide for connecting assembly 56 with assembly 54. Connector 80 allows assembly 56 to be hardwired to either assembly 54 and/or light switch 24, which preferably includes gateway module 6 (FIG. 1). Doorbell button and annunciation assembly 56 is secured to a standard, single gang junction box (not shown) mounted directly on a wall stud or mounted in a multi-gang junction box (not shown).

Referring to FIGS. 1, 5 and 6, doorbell chime and switch assembly 54 permits an occupant of room 10 to activate or deactivate DND and MUR requests by simply depressing the desired DND button 58 or MUR button 60. When DND button 58 is depressed, doorbell chime and switch assembly 54 provides signal to doorbell button and annunciation assembly 56 to cause DND legend 72 to be illuminated (DND button 58 is also illuminated). In addition, doorbell button 70 or chime speaker 68 is deactivated. When MUR button 60 is depressed, doorbell chime and switch assembly 54 provides signal to doorbell button and annunciation assembly 56 to cause LED 74 to be illuminated (MUR button 60 is also illuminated). The functionality of the DND and MUR buttons is mutually exclusive, so only one of these buttons can be activated at a time. Server 526 (FIG. 18) can also direct incoming calls to the room to be diverted to voice mail and active MUR or butler call requests to be cancelled when the DND command is activated. When doorbell button 70 is depressed, doorbell button and annunciation assembly 56 provides signal to doorbell chime and switch assembly 54 to cause chime speaker 68 to sound or chime.

In addition, an occupancy sensing and annunciation 82 can also be connected to doorbell chime and switch assembly 54 via a wire connection (note shown). Occupancy sensing and annunciation 82 includes an entry door switch 84 (such as INNCOM's S241) and a 2-wire or 3-wire passive infra-red device 86 that can be connected to doorbell chime and switch assembly 54 via a wire connection (not shown). Server 526 (FIG. 18) executes programming instructions for occupancy determination, e.g., based on motion detection by device 86 and the state of door switch 84.

Occupancy sensing and annunciation 82 also includes a hidden switch 88 which can be located on assembly 56. For occupancy determination, the housekeeper or other staff member activates hidden switch 88 on doorbell button and annunciation assembly 56. Hidden switch 88 is mechanically activated when a housekeeper or other staff member activates hidden switch 88 by depressing it. Hidden switch 88 can also be magnetically activated when the housekeeper or other staff member activates the hidden switch 88 by placing a small, handheld magnet (not shown) near the hidden switch. If the room 10 is occupied, the DND legend 72 flashes; if the room 10 is unoccupied, the MUR LED 74 flashes (or other suitable means of discretely notifying the staff).

Referring to FIGS. 1 and 2B, thermostat 16 and/or heating and air conditioning unit 18 may also include module 44. When an occupant adjusts the temperature, that information can be transmitted to system 500 (FIG. 18). The information can be used to determine and analyze the preferred temperature settings by an occupant.

In addition, module 44 on heating and air conditioning unit 18 may also communicate with occupancy sensing and annunciation 82 so that energy saving temperature settings can be employed. For instance, if the heating and air conditioning unit 18 is an EMS device, then module 44 on EMS device communicates with gateway module 6 and acts according to pre-programmed, occupancy-status logic. If an occupant exits a room, the occupancy sensing and annunciation 82 communicates with gateway module 6, which then transmits the information to server 526 (FIG. 18). Server 526 then transmits information to gateway module 6, which then communicates with module 44 of the EMS device and turns off EMS device, which in turn lowers the temperature setting in the room and saves energy.

Alternatively if an occupant enters a room, the occupancy sensing and annunciation 82 communicates with gateway module 6, which then transmits the information to server 526 (FIG. 18). Server 526 then transmits information to gateway module 6, which then communicates with module 44 of the EMS device and turns on EMS device, which in turn raises or lowers the temperature setting in the room to either a preprogrammed setting or a stored profile setting.

Module 44 can also be located on a curtain control 89 so that, when the room is not occupied, curtain control 89 can either open or close the blinds in order to either block the sun or let the sun into the room in order help implement energy saving methods. In addition, module 44 can also indicate whether the curtains are open or shut. Again, module 44 of curtain control communicates with gateway module 6, which in turns sends the information to server 526 (FIG. 18). Server 526 in turn stores that information in a profile or uses that information to transmit data back to gateway module 6 in order for gateway module 6 to communicate with module 44 of curtain control 89 in order to open or close the blinds.

Figure 7:
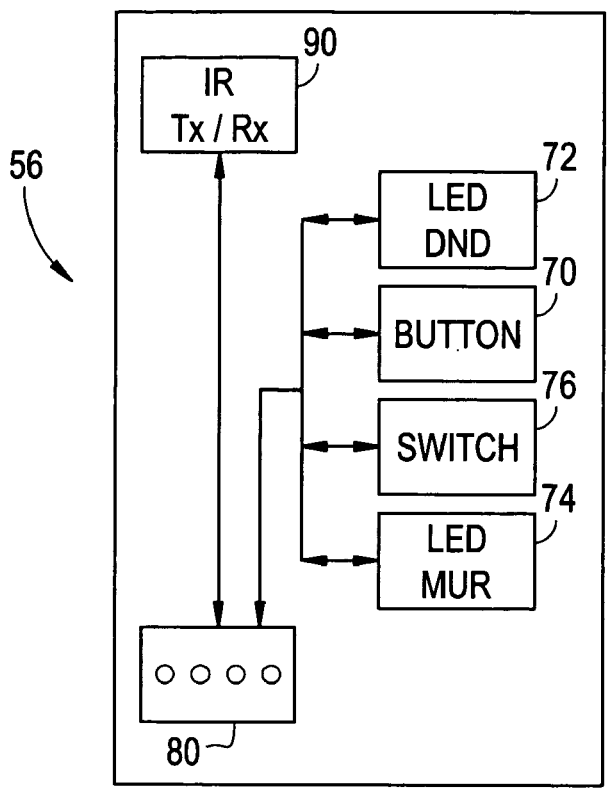
FIG. 7 is a schematic view of an alternative embodiment of the doorbell button and annunciation assembly of FIG. 6.
Figure 8:
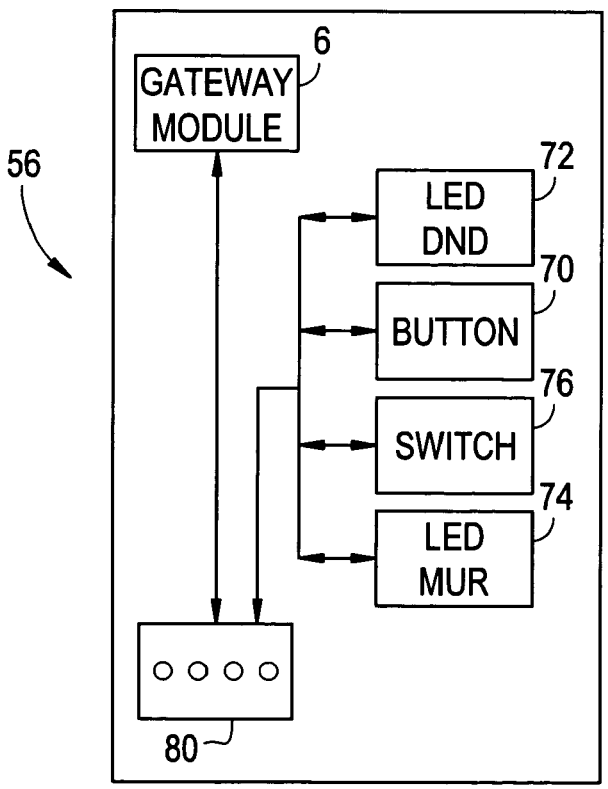
FIG. 8 is a schematic view of an alternative embodiment of the doorbell button and annunciation assembly of FIG. 6.

Referring to FIGS. 7 and 8, alternative embodiments of doorbell button and annunciation assembly 56 are illustrated. FIG. 7 illustrates assembly 56 as including an infrared transceiver 90, which is wired, by way of connector 80 to gateway module 6 in the room 10 (FIG. 1). FIG. 8 illustrates assembly 56 as including gateway module 6 instead of infrared transceiver 90, which as described above includes infrared transceiver 38 (FIG. 2A), and which is wired to the LAN or the other gateway module 6 in the room, by way of the connector. Infrared transceivers 38 and 90 communicate with a staff communication (tracking and/or messaging) device 100 (FIG. 9).

Figure 9:
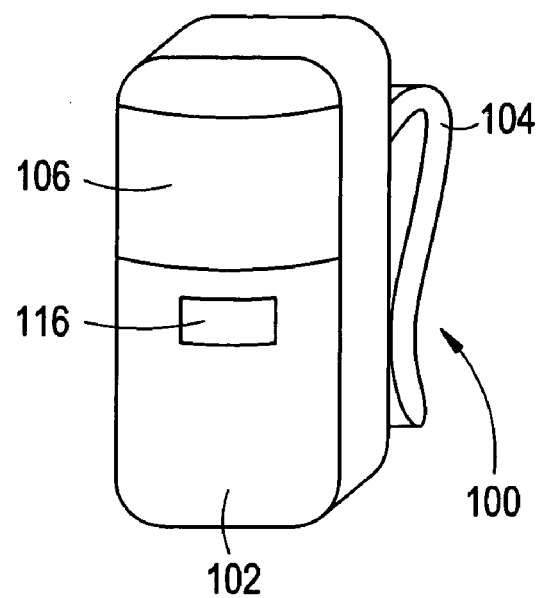
FIG. 9 is a front perspective view of a staff tracking device incorporating a staff tracking module.
Figure 10:
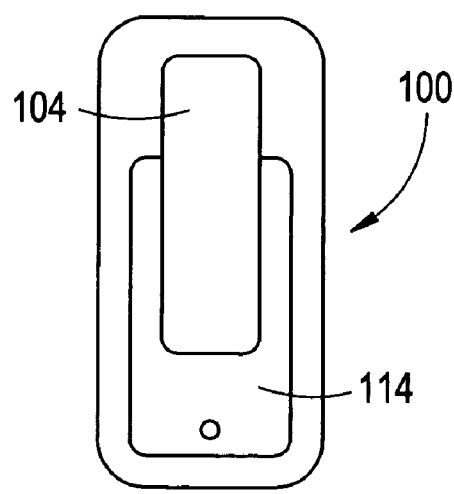
FIG. 10 is a back view of the staff tracking device of FIG. 9.
Figure 11:
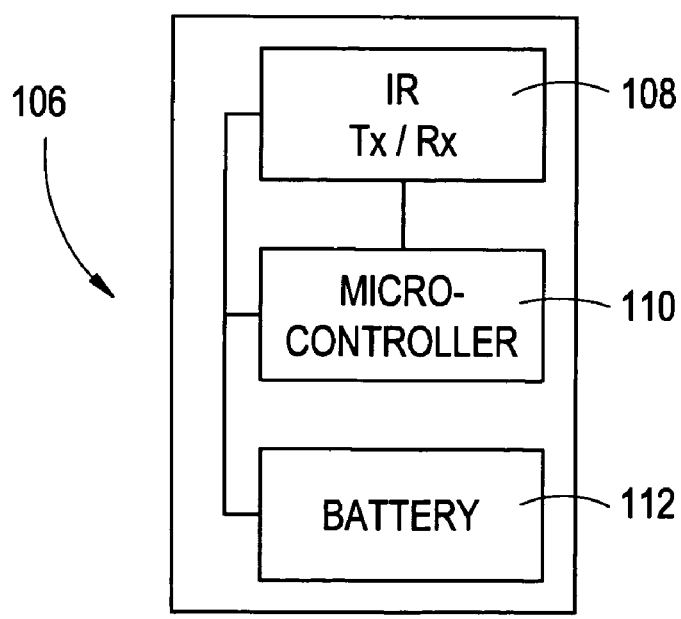
FIG. 11 is the staff tracking module of FIG. 9.

Referring to FIGS. 9–11, staff communication (tracking and/or messaging) device 100 is shown as a discrete device, however, it is within the scope of the present invention that the functions of staff communication (tracking and/or messaging) device 100 be incorporated into a cell phone, a pager, a personal data assistant (PDA), or any other similar device carried by such staff. Further, although staff communication (tracking and/or messaging) device 100 is shown and described below as having a generally elongated rectangular shape, with a clip for attaching, typically, to a belt of a wearer, it could be worn around the neck using a chain or other similar means. Staff communication (tracking and/or messaging) device 100 could also be shaped as or incorporated into an identification badge or card worn by such staff.

Staff communication (tracking and/or messaging) device 100 comprises a generally elongated rectangular housing 102, preferably comprised of a molded rugged plastic. A resilient clip 104 is secured to the rear of housing 102 by a screw (not shown) or other suitable means, to allow for clipping of staff communication (tracking and/or messaging) device 100 on a belt (or the like) of a staff to be tracked. A staff tracking module 106 is located on staff communication (tracking and/or messaging) device 100. Module 106 includes an infrared transceiver and/or transmitter 108 that is connected to a microcontroller 110 having associated memory for providing infrared communication. Staff tracking module 100 is powered by a power source 112, which is preferably a battery and may include a rechargeable battery with associated means for recharging the battery, such being well known. A battery access panel 114 is also provided at the rear of housing 102 to provide for access to battery 112.

Referring to FIGS. 7–11, staff communication (tracking and/or messaging) device 100 communicates with infrared transceivers 38 and 90 located on assembly 56 to provide for staff tracking. Infrared communication is in a suitable protocol that is compatible with assembly 56. The infrared communication protocol may be any suitable infrared protocol such as described hereinbefore.

Assembly 56 communicates with server 526 (FIG. 18), which stores information regarding the location of the staff members. Each staff communication (tracking and/or messaging) device 100 can be programmed through module 106 so that microcontroller 110 is designated with a staff number. In addition, microcontroller 110 can be reprogrammed at any time, as necessary.

Staff communication (tracking and/or messaging) device 100 may also include a transmitter, which is preferably incorporated with infrared transceiver 108. Server 526 (FIG. 18) can send a signal to a designated staff member, which then alerts the staff member to contact the main office. Staff communication (tracking and/or messaging) device 100 may include an alert system 116, which could be a light, an LED, a bell, or a motion system.

Figure 12:
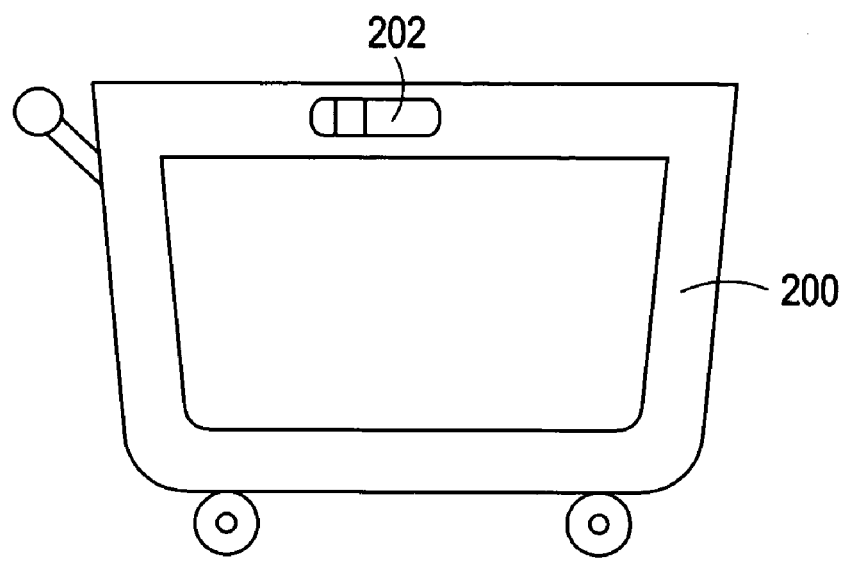
FIG. 12 is a side view of a hotel cart incorporating a cart tracking module.
Figure 13:
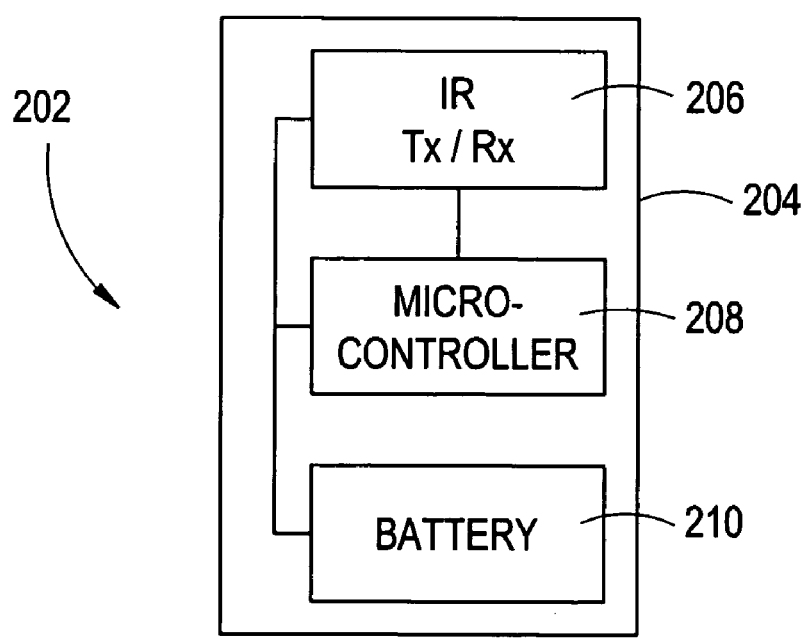
FIG. 13 is the cart tracking module of FIG. 12.

Referring to FIG. 12, a cart 200 includes a cart tracking module 202 associated therewith (attached thereto or incorporated therein). Cart tracking module 202 comprises a generally elongated rectangular housing 204, preferably comprised of a molded rugged plastic. An infrared transceiver (or infrared transmitter) 206 is connected to a microcontroller 208 having associated memory for providing infrared communication. Cart tracking module 202 is powered by a battery 210, which may comprise a rechargeable battery with associated means for recharging the battery, such being well known. Cart tracking module 202 communicates with assembly 56 (see FIGS. 1, 7, and 8) to provide for cart tracking. Cart tracking module 202 is secured to the cart 200 by a screw (not shown) or other suitable means. Battery access panel (not shown) is also provided.

The infrared communication protocol may be any suitable infrared protocol such as described hereinbefore.

Infrared transceiver 206 communicates with assembly 56, which in turn communicates with server 526 (FIG. 18). Server 526 stores information regarding the location of the carts. Each cart 200 can be programmed through module 202 so that microcontroller 208 is designated with a cart number. In addition, server 526 can then send a signal to a staff member through the staff tracking device 100 and alert system 116, which can designate the location of cart 200 to the staff member and alert the staff member to pick up the cart 200.

Figure 14:
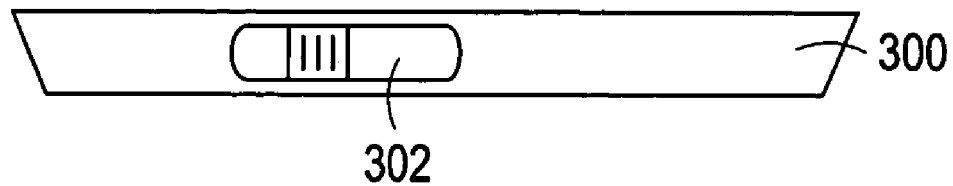
FIG. 14 is a side view of a food tray incorporating a food tray tracking module.
Figure 15:
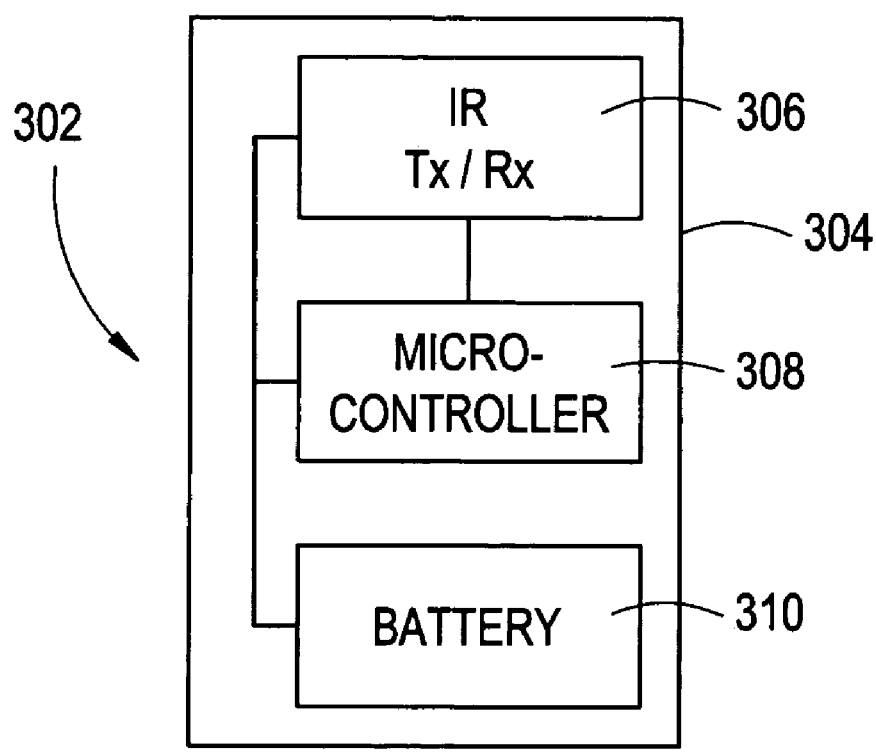
FIG. 15 is the food tray module of FIG. 14.

Referring to FIG. 14 a food tray 300 includes a food tray tracker module 302 associated therewith (attached thereto or incorporated therein). Food tray tracking module 302 comprises a generally elongated rectangular housing 304, preferably comprises of a molded rugged plastic. An infrared transceiver (or infrared transmitter) 306 is connected to a microcontroller 308 having associated memory for providing infrared communication. Food tray tracking module 302 is powered by a battery 310, which may comprise a rechargeable battery with associated means for recharging the battery, such being well known. Food tray tracking module 302 is secured to the food tray 300 by a screw (not shown) or other suitable means. Battery access panel (not shown) is also provided.

The infrared communication protocol may be any suitable infrared protocol such as described hereinbefore.

Infrared transceiver 306 communicates with assembly 56, which in turn communicates with server 526 (FIG. 18). Server 526 stores information regarding the location of the food trays. Each food tray 300 can be programmed through module 302 so that microcontroller 308 is designated with a tray number. In addition, server 526 can then send a signal to a staff member through the staff tracking device 100 and alert system 116, which can designate the location of food tray 300 to the staff member and alert the staff member to pick up the food tray 300.

Figure 16:
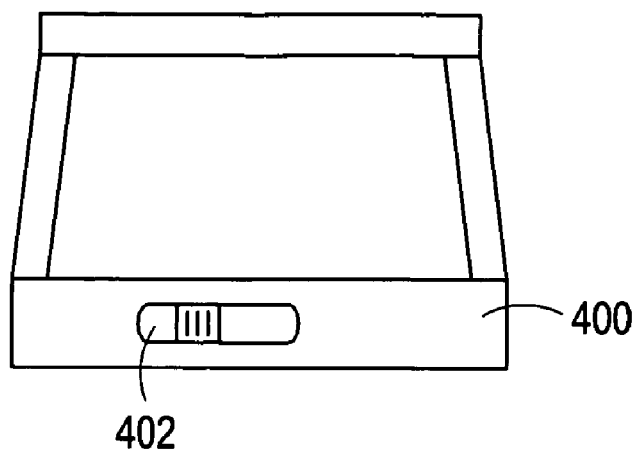
FIG. 16 is a side view of a shoe shine box incorporating a shoe shine tracking module.
Figure 17:
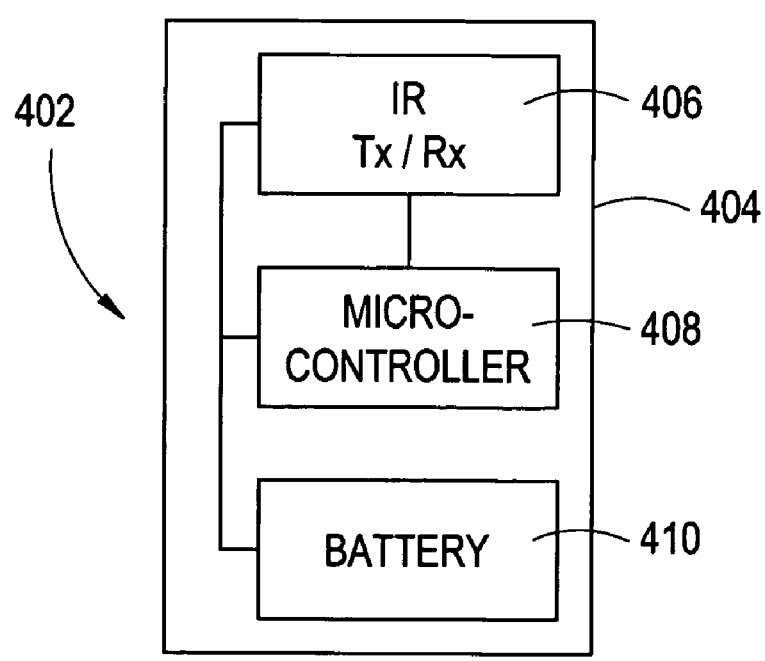
FIG. 17 is the shoe shine tracking module of FIG. 16.

Referring to FIG. 16, a shoe shine box 400 includes a shoe shine box tracking module 402 associated therewith (attached thereto or incorporated therein). Shoe shine box 400 comprises a generally elongated rectangular housing 404, preferably comprises of a molded rugged plastic. An infrared transceiver (or infrared transmitter) 406 is connected to a microcontroller 408 having associated memory for providing infrared communication. Shoe shine box tracking module 402 is powered by a battery 410, which may comprise a rechargeable battery with associated means for recharging the battery, such being well known. Shoe shine tracking module 402 is secured to shoe shine box 400 by a screw (not shown) or other suitable means. Battery access panel (not shown) is also provided.

The infrared communication protocol may be any suitable infrared protocol such as described hereinbefore.

Infrared transceiver 406 communicates with assembly 56, which in turn communicates with server 526 (FIG. 18). Server 526 stores information regarding the location of the shoe shine boxes. Each shoe shine box 400 can be programmed through module 402 so that microcontroller 408 is designated with a shoe shine box number. In addition, server 526 can then send a signal to a staff member through the staff tracking device 100 and alert system 116, which can designate the location of shoe shine box 400 to the staff member and alert the staff member to pick up the shoe shine box 400.

It is contemplated that cart tracking module 202, food tray tracking module 302, and shoe shine box tracking module 402 are all similar in that each module transmits to assembly 56 to communicate the module's location. Cart 200, food tray 300, and shoe shine box 400 are generally referred to herein as a service device. Cart 200 includes, but is not limited to a food service cart, a maid service cart, a mini-bar service or restocking cart, and a maintenance cart.

FIG. 18 depicts a centralized room control system or network 500 of the type described in International Application Serial No. PCT/US02/02354, filed on Jan. 24, 2002, entitled Smart Router for a Guest Room Service and Control System, which is incorporated herein by reference. Building-level services such as, but not limited to, central electronic lock control, energy management, room control, and Internet access services are provided to one or more rooms 10 throughout one or more hotels 502 (or other multi-unit building) over the same network. While the present example is directed to one or more hotels 502, it will be recognized that the system 500 has application in a wide range of multi-unit buildings including, but not limited to, universities, health care, multi-dwelling units (MDUs), office, resort, and residential.

Room control system 500 is distributed across three general areas: one or more rooms 10, hotel 502 including the one or more rooms 10, and a location external to the hotel 502. It will be appreciated that the room control system 500 can be distributed across any number of rooms 10 in the hotel 502 and any number of buildings or hotels 502.

Inside hotel 502, room control system 500 is divided by a smart router 510 into two sub-networks: a primary network 512 and a secondary network 514. Secondary network 514 includes a local area network (LAN) 516 employing the Ethernet protocol for transferring data encapsulated in packets. LAN 516 includes a main switch 518 that filters and forwards packets between one or more floor switches 520. Floor switches 520 filter and forward packets to rooms 10 on a floor of hotel 502.

Secondary network 514 includes a commercially available property management system (PMS) server 522 connected serially or via the Ethernet to smart router 510. PMS server 522 may include, for example, the Micros® Fidelio OPERA PMS, which is commercially available from Micros Systems, Inc. of Columbia, Md. PMS server 522 stores, processes, and recalls room usage information (i.e., whether the room is rented or vacant) and room billing information for lodging fees, Internet access, video-on-demand, mini-bar usage and other services. PMS server 522 transmits room status information to and accepts billing information from smart router 510.

Secondary network 514 also includes a web browser station 524, which is a personal computer connected to a port of main switch 518. Web browser station 524 allows hotel personnel to access hotel information. The station 524 uses a browser to provide indication on rented status, room occupancy, minibar service, do-not-disturb (DND) and make-up-room (MUR) requests, diagnostics and other data. Engineering or management personnel will be able to see information on energy management performance, diagnostic alerts and other useful items. A central interface server (CIS) 526 is also provided, which stores, processes, and recalls room control signals to augment on-site capability. One example of a CIS 526 is Inncom International's commercially available CIS-5 22058 Central Interface Server.

Primary network 512 includes a LAN 528 employing the Ethernet protocol for transferring data encapsulated in packets. LAN 528 includes one or more information servers 530 and a router 532. Information servers 530 store, process, and retrieve data typically used in the operation of a modem hotel system.

Router 532 connects primary network 512 with the Internet 534. Router 532 receives TCP/IP packets from the Internet 534 and uses packet headers and a forwarding table stored within router 532 to direct the packets to smart router 510 or information server 530. Router 532 also provides firewall and security services for the primary and secondary networks 512, 514. In addition to router 532, a modem 540 connects primary network 512 with the Internet 534 via smart router 510, and smart router 510 provides a firewall and security services for the primary and secondary networks 512, 514.

Outside hotel 502, all hotel data, including the hotel's in-house Internet homepage, are stored and maintained on a remote server 542. Remote server 542 is connected to the Internet 534, and a connection between the remote server 542 and router 532 in hotel 502 is maintained via a Virtual Private Network (VPN) Tunnel 546. All Internet traffic coming from router 532 or modem 540 in hotel 502 is automatically directed to remote server 542 through Virtual Private Network (VPN) 546. A CIS 548 is located outside hotel 502 and communicates with primary system 512 via VPN 546 and router 532. By placing CIS 548 at a remote site, CIS 548 can store, process, and recall control signals for legacy room control systems in any number of hotels 502. The remote CIS 548 can replace or supplement information server 530 in hotel 502.

Because all Internet traffic to and from hotel 502 traverses VPN 546 to remote server 542, remote server 542 can act as a portal for internet traffic.

Smart router 510 periodically connects through modem 540 and VPN 546 to the remote server 542. Through these connections, smart router 510 off-loads collected hotel and occupant information to the remote server 542. This information can be monitored using a web browser station 550 connected with the remote server 542. In addition, remote server 542 provides this information back to the hotel 502, via router 532 and VPN 546, where the information can be viewed through browser station 550. In this manner, a single user can view the status of any number of hotels 502 or hotel rooms 10 from a single location (e.g., browser station 524 or browser station 550).

Communication between smart router 510 and the room control devices, i.e., door lock 12, television set box top 14, thermostat 16, and/or a heating/air conditioning unit 18, telephone 20, and mini-bar 22, via gateway module 6 is performed using a series of query and reply frames (packets) using UDP as the link protocol. Each frame includes a frame header containing addressing information for a specific room gateway module 6 and a specific room control device, a frame sequence number, a control flag that can disable a reply to the frame, and a field that defines the type of the frame (e.g., query by smart router 510, query by room gateway module 6, response by smart router 510, or response by room gateway module 6).

By way of example, smart router 510 can off-load data to room control device via gateway module 6 by using a series of query frames with their control flags set to disable any reply. For example, when an occupant/guest checks in to hotel (or other multi-unit building) 502, a desk clerk enters occupant/guest information into a terminal (not shown) connected to PMS server 522. The occupant/guest information is stored as a record in the PMS server 522, and the PMS server 522 provides the data to smart router 510, which in turn relays the information to the specific gateway module 6 for the rented room. For a more detailed explanation of this process, please see International Application Serial No.

PCT/US02/02354, filed on Jan. 24, 2002, entitled Smart Router for a Guest Room Service and Control System.

Once gateway module 6 receives the information, gateway module 6 transmits the information to one of the room control devices. For instance, when an occupant/guest first checks into the hotel (or other multi-unit building), gateway module 6 may communicate with heating and air conditioning unit 18, or the EMS device, which may switch the room heating or air conditioning system from an energy savings mode to a occupant's comfort mode. Similar communications may be provided to other devices in the room. For example, a signal may be sent to a DDC device to open or close the drapes, turn on an audio/visual device (such as a TV), initialize the minibar monitoring device, and program the CELS device with a new key code given to the occupant/guest.

Remote server 542 also connects with smart router 510 to upload data from remote server 542 to smart router 510. Smart router 510 will then direct the data to the PMS server 522 or to the appropriate floor, room, and appliance. In this manner, a single user can alter the state of the PMS or any appliance in any room from a remote location.

The room status process program periodically resends room status data to the room control device. Upon the occupant's check out, the process is repeated with PMS 522 providing the occupant information to the smart router 510, and the room status process program providing the room status data to the room control device, which accepts the data and acts according to its pre-programmed, vacant-status logic. For example, the room control device may switch the heating or air condition system from the occupant's comfort mode to an energy savings mode.

Where smart router 510 requires a reply from one of the room control devices, smart router 510 can query the room control via room gateway module 6 using one or more frames having their control flags set to enable a response. Upon receiving these frames, room gateway module 6 will strip the header from the frame and send the data to the appropriate room control device. Room gateway module 6 saves the frame sequence number in anticipation of the response. Upon response from the room control device, room gateway module 6 encapsulates the response data within a frame and includes the frame sequence number in the appropriate field. Upon receiving the frame, smart router 102 identifies the response using the frame sequence number and processes the response data from the frame.

The room control device may be configured to provide an event message in response to some event within room 10. An event message may include the opening of a door to a minibar or operation of a door lock by someone in room 10, for example. Upon receiving such an event message, room gateway module 6 encapsulates the event message into one or more frames. Each frame includes addressing information from the room control device. Room gateway module 6 sends the frames to smart router 510, which uses the addressing information to determine the origin and appropriate response to the event message.

Smart router 510 is discussed in greater detail in International Application Serial No. PCT/US02/02354, filed on Jan. 24, 2002, entitled Smart Router for a Guest Room Service and Control System, which has been incorporated herein by reference, and reference should be made thereto for a more detailed description of smart router 510.

Also as described in International Application Serial No. PCT/US02/02354, filed on Jan. 24, 2002, entitled Smart Router for a Guest Room Service and Control System, which has been incorporated herein by reference, data communication between LAN 528 or modem 540 and LAN 516 or PMS 522 is accomplished at the application levels of primary and secondary network processing systems. That is, data communication therebetween is handled by applications programs.

Figure 19:
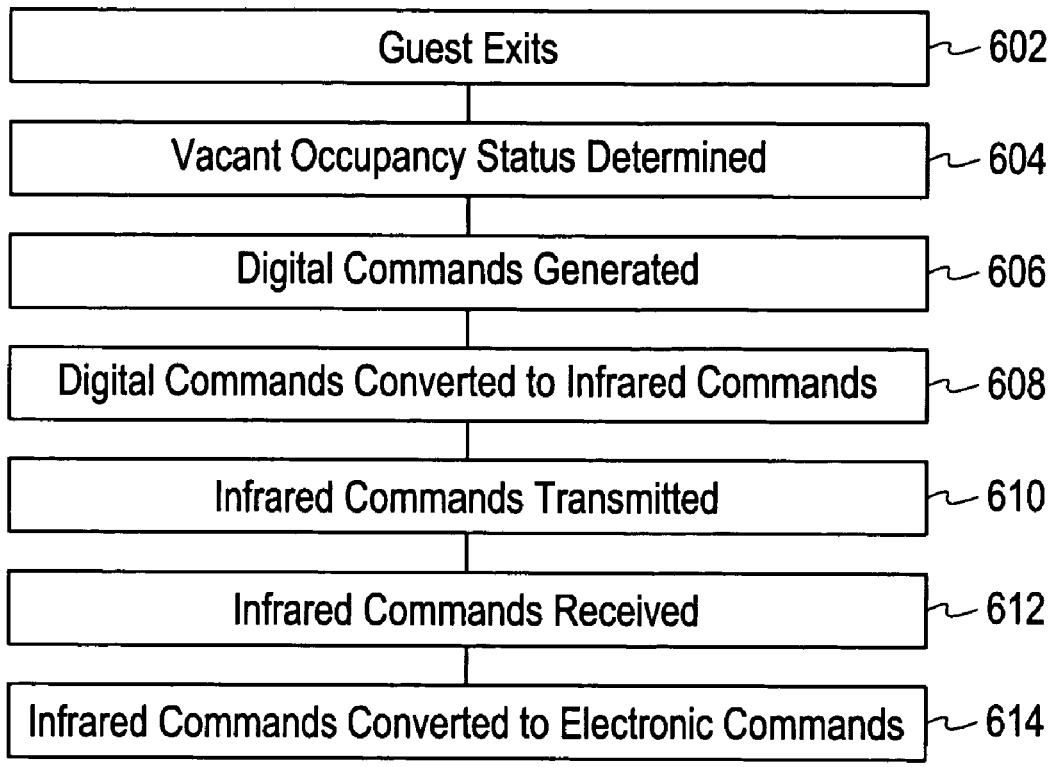
FIG. 19 is a flow diagram of an exemplary method for effecting a reduction of energy usage in a room of a multi-unit building.

FIGS. 19–25 are exemplary embodiments of how system 500 works. FIG. 19 is a flow diagram of an exemplary method for effecting a reduction of energy usage in a room of a multi-unit building. In particular, the reduction of energy usage occurs when a occupant exits a room, either because the occupant/guest is checking out or is leaving the room temporarily. At step 602, the occupant exits the room. At step 604, the vacant occupancy status is determined via either through tracking the actuation of the door or through detecting motion or the lack thereof within the room. Also at step 604, the vacant occupancy status is then communicated through a gateway module, which is located in the room. The gateway module then communicates the information to a server, which is located outside of the room. At step 606, digital commands are generated at the server and the server sends the digital commands to the gateway module. At step 608, the gateway module converts the digital commands into infrared commands. At step 610, the infrared commands are transmitted to a transceiver/transmitter module at a room environmental control device within the room. The room environmental control device includes a thermostat, a heating and/or air conditioning unit, and/or blinds. At step 612, the transceiver/transmitter module receives the infrared commands. At step 614, the transceiver/transmitter module converts the infrared commands to electronic commands, which then turns off the light switch, closes, and/or changes the temperature of the room.

Figure 20:
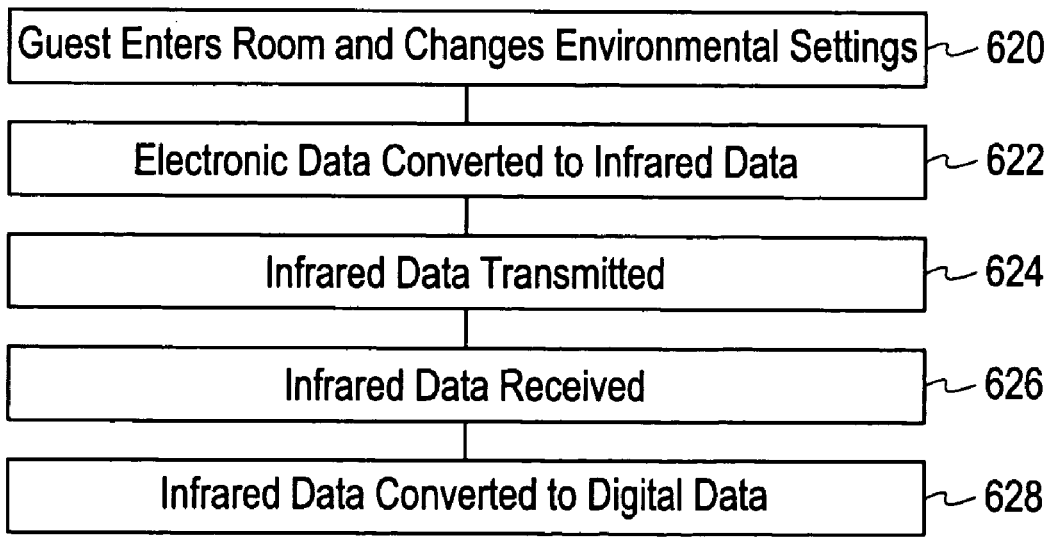
FIG. 20 is a flow diagram of an exemplary method for profiling an occupant's desired environmental settings in a room of multi-unit building.

FIG. 20 is a flow diagram of an exemplary method for profiling an occupant's desired environmental settings in a room of multi-unit building. At step 620, an occupant/guest enters a room and makes certain selections at various room environmental control devices, such as, turning on a light, turning on the television, turning up or lowering the heat or air conditioning. At step 622, the transceiver/transmitter module converts the electronic data indicative of a setting on a room environmental control device into infrared data. At step 624, the transceiver/transmitter module transmits the infrared data from the room environmental control device. At step 626, a gateway module located in the room receives the infrared data. At step 628, the gateway module converts the infrared data into digital data and sends the digital data to a server, which is located outside of the room. The server then generates a profile of the occupant's desired environmental settings.

Figure 21:
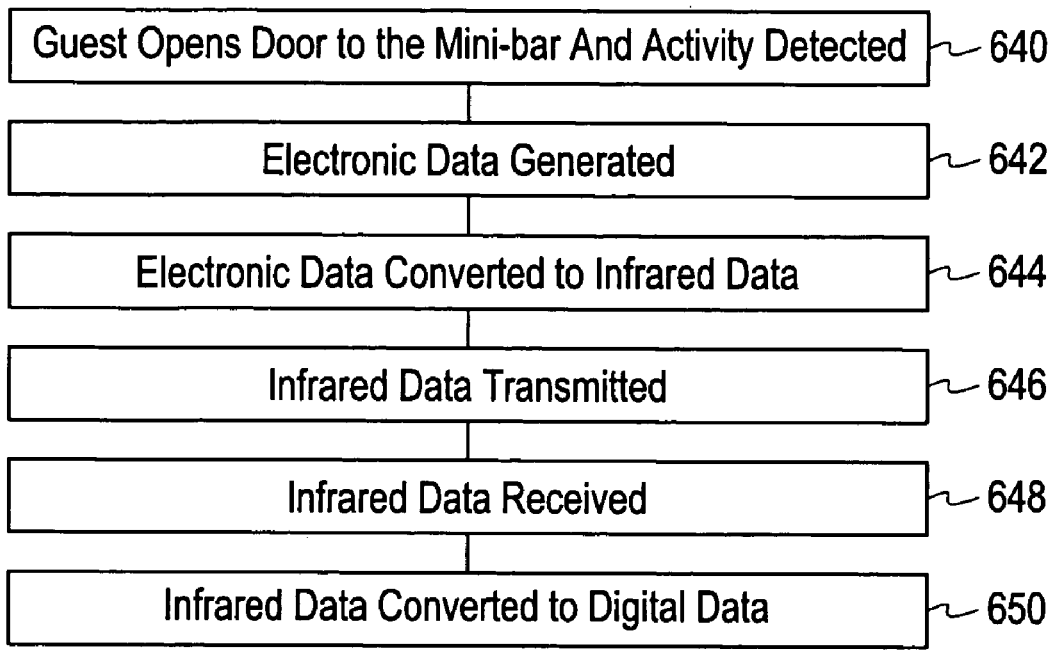
FIG. 21 is a flow diagram of an exemplary method for determining a condition of mini-bar in a room of a multi-unit building.

FIG. 21 is a flow diagram of an exemplary method for determining a condition of mini-bar in a room of a multi-unit building. At step 640, an occupant/guest opens a door to the mini-bar and removes an item from the mini-bar. The mini-bar has a transceiver/transmitter module that can detect when the door is opened and/or when an occupant/guest removes of an item from the mini-bar. At step 642, when the occupant/guest opens the door and/or removes an item, the transceiver/transmitter module generates electronic data in response to the activity at the mini-bar. At step 644, the transceiver/transmitter module converts the electronic data into infrared data. At step 646, the transceiver/transmitter module transmits the infrared data to a gateway module located in the room. At step 648, the gateway module receives the infrared data. At step 650, the gateway module converts the infrared data into digital data, which is then sent to a server. The server stores that information and can also send the information to housekeeping so that housekeeping is aware that the mini-bar may need to be restocked.

Figure 22:
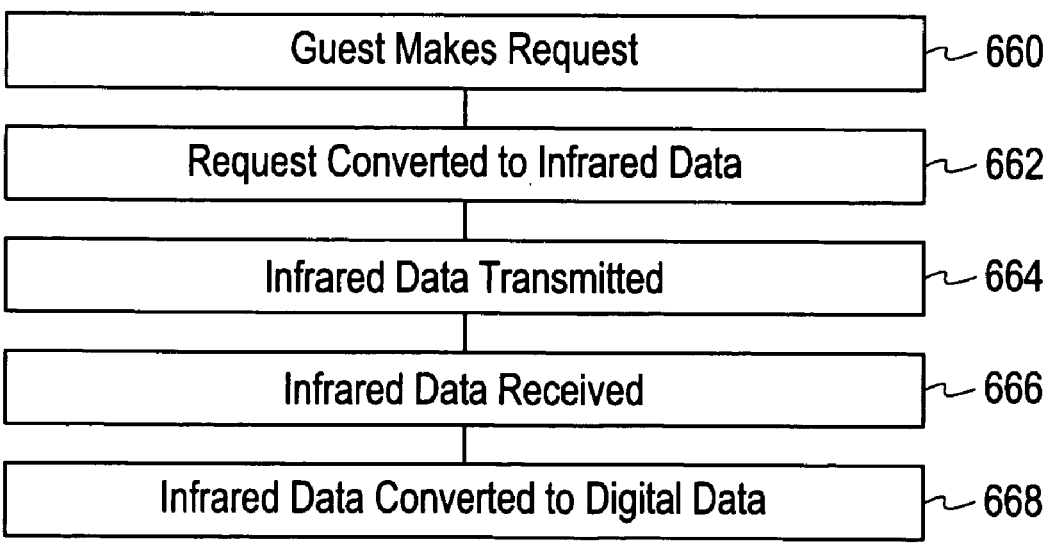
FIG. 22 is a flow diagram of an exemplary method for detecting a request of an occupant in a room of a multi-unit building.

FIG. 22 is a flow diagram of an exemplary method for detecting a request of an occupant in a room of a multi-unit building. At step 660, the occupant makes a request, such as making up the room, do not disturb, or requesting help with luggage. The request is made at an interface device located inside the room. At step 662, the interface device has a transceiver/transmitter module that converts the request into infrared data. At step 664, the transceiver/transmitter module transmits the infrared data from the interface device to a gateway module. At step 666, the gateway module receives the infrared data. At step 668, the gateway module converts the infrared data into digital data and the digital data can be transmitted to an indicator located outside of the room, near the entry to the room. The indictor can light up an indication that the room needs to be cleaned or can light up an indication that the occupant does not want to be disturbed. In addition, the digital data can be sent to a server located outside of the room. The server can then send the information to the appropriate place, i.e., housekeeping or guest/occupant services, so that the information can be processed and a staff member can take an appropriate action.

Figure 23:
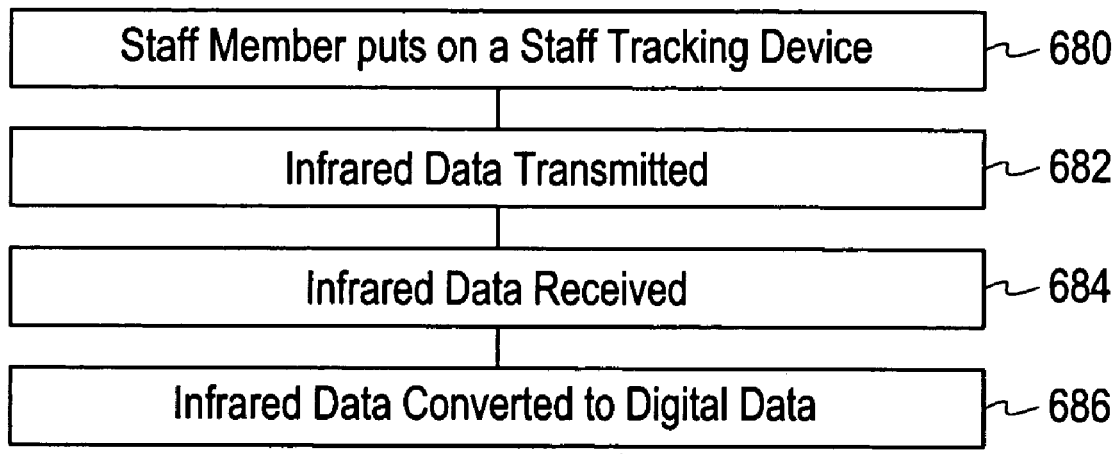
FIG. 23 is a flow diagram of an exemplary method for locating a staff member within a multi-unit building.

FIG. 23 is a flow diagram of an exemplary method for locating a staff member within a multi-unit building. At step 680, a staff member puts on a staff communication (tracking/messaging) device. The staff communication (tracking/messaging) device includes a card, a beeper, a cell phone, or any other portable device that is easily carried by the staff member. At step 682, the staff communication (tracking/messaging) device transmits infrared data, which includes the identity of the staff member. Usually, the identity could be the staff member's name or a number/code, which has been assigned to the staff member. At step 684, either a transceiver/transmitter module or a gateway module receives the infrared data.

The transceiver/transmitter module is located in the hallways of the building at each room. The transceiver/transmitter module can be incorporated into the indication panel that also serves to notify the staff member if a room needs to be cleaned or if the occupant does not want to be disturbed. The transceiver/transmitter module, which is located on the indication panel outside of the room, is wired to a gateway module that is located in the corresponding room. The gateway module that is located in each room is preferably incorporated into a light switch near the door; however, the gateway module can be incorporated into the mini-bar, the television, the telephone, or thermostat.

At step 686, the transceiver/transmitter module and/or gateway module converts the infrared data into digital data and sends that information to a server. The server can then relay that information to the appropriate party, such as housekeeping. The information will indicate which room the staff member is located within or will indicate which room the staff member is near, if the staff member is in a hallway.

Figure 24:
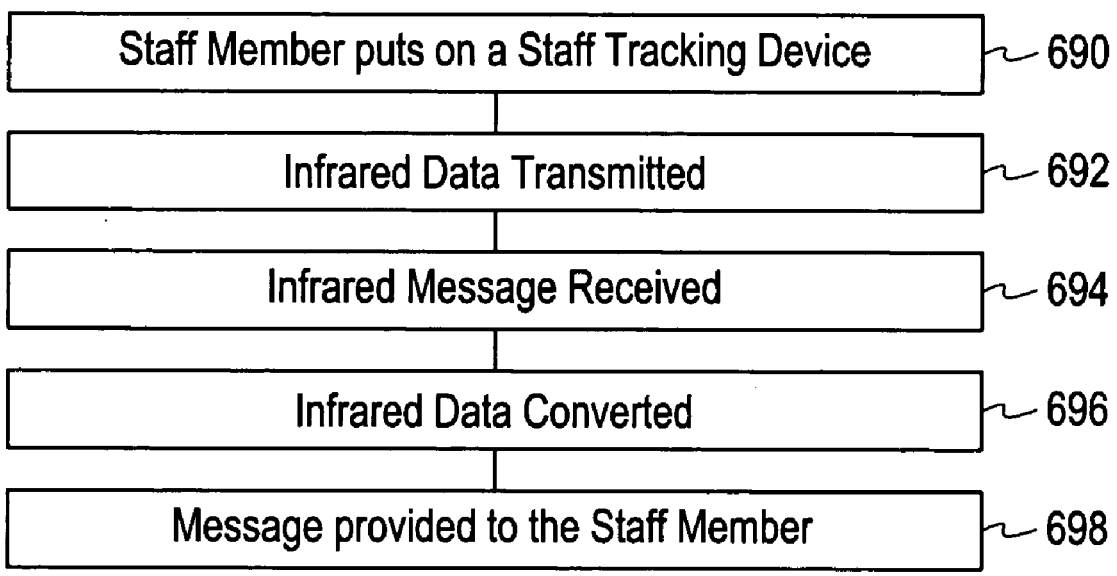
FIG. 24 is a flow diagram of an exemplary method for sending a message to a staff member within a multi-unit building.

FIG. 24 is a flow diagram of an exemplary method for sending a message to a staff member within a multi-unit building. At step 690, a staff member puts on a staff communication (tracking/messaging) device. The staff communication (tracking/messaging) device includes a card, a beeper, a cell phone, or any other portable device that is easily carried by the staff member. Housekeeping sends a signal to server, which then sends a signal to gateway modules and transceiver/transmitter modules, which are connected to the gateway modules. The modules convert the information into infrared data. At step 692, the infrared data is transmitted within the multi-unit building indicative of a message for a staff within the multi-unit building. At step 694, the staff communication (tracking/messaging) device at the staff member receives the infrared data. At step 696, the infrared data is converted into electrical data. At step 698, the electrical data provides a message to the staff in a detectable format, such as a beeper, a flashing light, a vibration, or a telephone ring.

Figure 25:
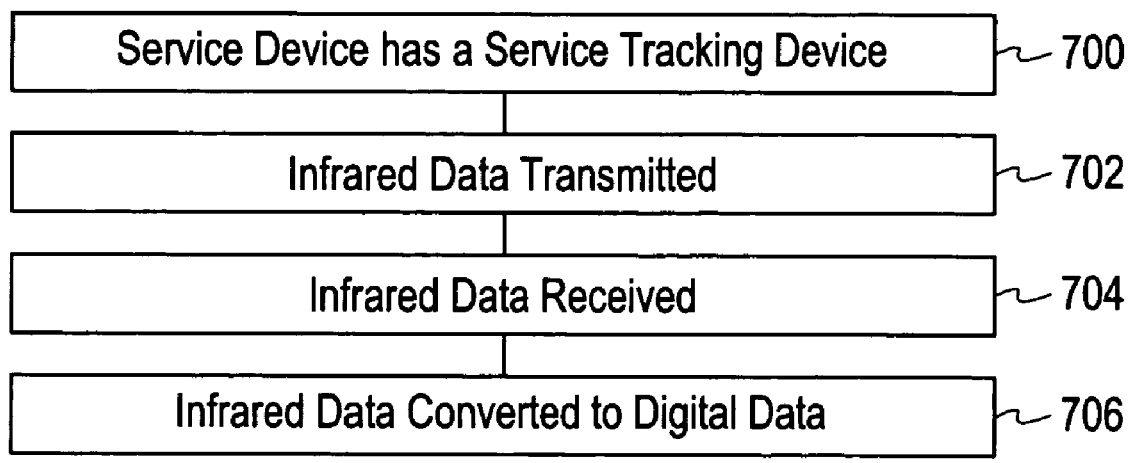
FIG. 25 is a flow diagram of an exemplary method for locating a service device within a multi-unit building.

FIG. 25 is a flow diagram of an exemplary method for locating a service device within a multi-unit building. Examples of the service device include a cart, a shoe shine box, or a food tray. At step 700, a service tracking device is placed on or incorporated within the service device. At step 702, the service tracking device transmits infrared data, which includes the identity of the service device. Usually, the identity is some type of number and/or code associated with the device. At step 704, either a transceiver/transmitter module or a gateway module receives the infrared data.

The transceiver/transmitter module is located in the hallways of the building at each room. The transceiver/transmitter module can be incorporated into the indication panel that also serves to notify the staff member if a room needs to be cleaned or if the occupant does not want to be disturbed. The transceiver/transmitter module, which is located on the indication panel outside of the room, is wired to a gateway module that is located in the corresponding room. The gateway module that is located in each room is preferably incorporated into a light switch near the door; however, the gateway module can be incorporated into the mini-bar, the television, the telephone, or thermostat. At step 706, the transceiver/transmitter module and/or gateway module receives the infrared data. At step 708, the transceiver/transmitter module and/or gateway module converts the infrared data into digital data and sends that information to a server. The server can then relay that information to the appropriate party, such as housekeeping. The information will indicate which room the service device is located within or will indicate which room the service device is near, if the service device is in a hallway.

Figure 26:
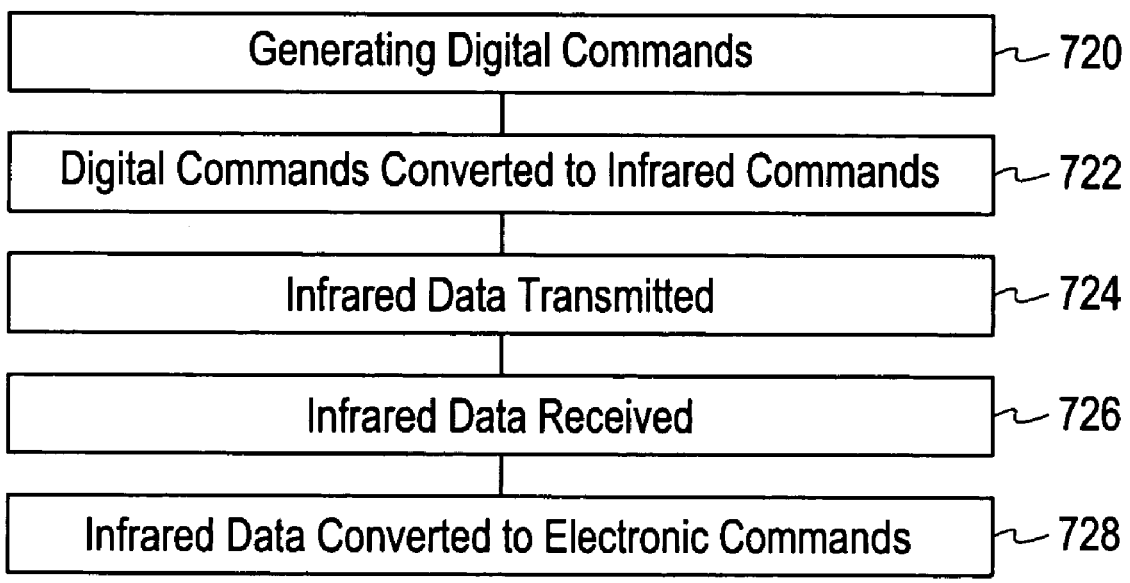
FIG. 26 is a flow diagram of an exemplary method for affecting a state of a door lock device associated with a room of a multi-unit building.

FIG. 26 is a flow diagram of an exemplary method for affecting a state of a door lock device associated with a room of a multi-unit building. At step 720, digital commands are generated in response to a determination to affect the state of the door lock device. In particular, a response may be generated when an occupant/guest checks out of the room and the computer then generates digital commands to change the code for the lock device. In addition, the computer may generate digital commands to lock or unlock the doors. In any event, the state of the door lock device is affected by either changing the code for the lock device or by changing the state of the lock from lock to unlock or vice versa. At step, 722 the digital commands are converted into infrared commands at the gateway module located inside of the room. At step 724, the infrared commands are transmitted from the gateway device. At step 726, the infrared commands are received at the door lock device. At step 728, the infrared commands are converted into electronic commands, which are processed by the door lock device to affect the state of the door lock device.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

The invention claimed is:

1. A method of effecting a reduction of energy usage in a room of a multi-unit building, comprising:
   determining a vacant occupancy status of the room;
   generating digital commands in response to the vacant occupancy status of the room;
   converting the digital commands at a gateway device located inside of the room into wireless commands;
   transmitting the wireless commands from the gateway device;
   receiving the wireless commands at a room environment control device located inside of the room; and
   converting the wireless commands into electronic commands which are processed by the room environmental control device to effect a reduction of energy usage by a room environmental device associated with the room environmental control device;
   wherein the gateway device is connected to a network of the multi-unit building and the digital commands are provided by the network.

2. The method of claim 1 wherein the vacant occupancy status comprises an un-rented room.

3. The method of claim 1 wherein the vacant occupancy status comprises a rented room that is un-occupied.

4. The method of claim 1 wherein the determining the vacant occupancy status comprises tracking actuation of a door switch associated with a door of the room.

5. The method of claim 1 wherein the determining the vacant occupancy status comprises detecting motion within the room.

6. The method of claim 1 further comprising:
   receiving the wireless commands at a window treatment control device within the room; and
   converting the wireless commands into electronic commands which are processed by the window treatment control device to set the window treatment to effect a reduction of energy usage by the room environmental device.

7. The method of claim 1 wherein the gateway device is associated with at least one of a light switch, a mini-bar, a telephone, a door lock, and a television set top box.

8. The method of claim 1 wherein the room environmental control device comprises a thermostat.

9. The method of claim 1 wherein the room environmental device comprises one of a Fan Coil Unit, a Heating Ventilation and Air Conditioning system, a Packaged Terminal Air Conditioner, and an Energy Management System.

10. The method of claim 1 wherein the wireless commands are diffused infrared dispersion.

11. A system for effecting a reduction of energy usage in a room of a multi-unit building, comprising:
    means for determining a vacant occupancy status of the room to generate digital commands in response thereto;
    a gateway device located inside of the room for converting the digital commands into wireless commands and transmitting the wireless commands within the room; and
    a room environment control device located inside of the room, the room environment control device including means for receiving the wireless commands and converting the wireless commands into electronic commands which are processed to effect a reduction of energy usage by a room environmental device associated with the room environmental control device;
    wherein the gateway device is connected to a network of the multi-unit building and the digital commands are provided by the network.

12. The system of claim 11 wherein the vacant occupancy status comprises an un-rented room.

13. The system of claim 11 wherein the vacant occupancy status comprises a rented room that is un-occupied.

14. The system of claim 11 wherein the means for determining the vacant occupancy status comprises a door switch associated with a door of the room.

15. The system of claim 11 wherein the means for determining the vacant occupancy status comprises a motion detector located inside of the room.

16. The system of claim 11 further comprising:
    a window treatment control device located inside of the room, the window treatment control device including means for receiving the wireless commands and converting the wireless commands into electronic commands which are processed to set a window treatment to effect a reduction of energy usage by the room environmental device.

17. The system of claim 11 wherein the gateway device is associated with at least one of a light switch, a mini-bar, a telephone, a door lock, and a television set top box.

18. The system of claim 11 wherein the room environmental control device comprises a thermostat.

19. The system of claim 11 wherein the room environmental device comprises one of a Fan Coil Unit, a Heating Ventilation and Air Conditioning system, a Packaged Terminal Air Conditioner, and an Energy Management System.

20. The system of claim 11 wherein the wireless commands are diffused infrared dispersion.

21. A method of profiling an occupant's desired environmental settings in a room of a multi-unit building, comprising:
    converting electronic data indicative of a setting on a room environmental control device located inside of the room into wireless data;
    transmitting the wireless data from the room environmental control device;
    receiving the wireless data at a gateway device located inside of the room; and
    converting the wireless data into digital data which is processed to generate a profile of the occupant's desired environmental settings;
    wherein the gateway device is connected to a network of the multi-unit building and the digital data is provided to the network.

22. The method of claim 21 wherein the gateway device is associated with at least one of a light switch, a mini-bar, a telephone, a door lock, and a television set top box.

23. The method of claim 21 wherein the room environmental control device comprises a thermostat.

24. The method of claim 21 wherein the room environmental device comprises one of a Fan Coil Unit, a Heating Ventilation and Air Conditioning system, a Packaged Terminal Air Conditioner, and an Energy Management System.

25. The method of claim 21 wherein the wireless data is diffused infrared dispersion.

26. A system for profiling an occupant's desired environmental settings in a room of a multi-unit building, comprising:
    a room environment control device located inside of the room, the room environment control device including means for converting electronic data indicative of a setting on a room environmental control device located inside of the room into wireless data and transmitting the wireless data from the room environmental control device;

a gateway device located inside of the room for receiving the wireless data at a gateway device located inside of the room and converting the wireless data into digital data; and means for processing the digital data to generate a profile of the occupant's desired environmental settings;

wherein the gateway device is connected to a network of the multi-unit building and the digital data is provided to the network.

27. The system of claim 26 wherein the gateway device is associated with at least one of a light switch, a mini-bar, a telephone, a door lock, and a television set top box.

28. The system of claim 26 wherein the room environmental control device comprises a thermostat.

29. The system of claim 26 wherein the room environmental device comprises one of a Fan Coil Unit, a Heating Ventilation and Air Conditioning system, a Packaged Terminal Air Conditioner, and an Energy Management System.

30. The system of claim 26 wherein the wireless data is diffused infrared dispersion.

31. A method of effecting a reduction of energy usage in a room of a multi-unit building, comprising:

determining a vacant occupancy status of a room;

generating digital commands in response to the vacant occupancy status of a room;

converting the digital commands at a gateway device located inside of the room into wireless commands;

transmitting the wireless commands from the gateway device;

receiving the wireless commands at a window treatment control device located inside of the room; and converting the wireless commands into electronic commands which are processed by the window treatment control device to set the window treatment to effect a reduction of energy usage.

wherein the gateway device is connected to a network of the multi-unit building and the digital commands are provided by the network.

32. The method of claim 31 wherein the vacant occupancy status comprising an un-rented room.

33. The method of claim 31 wherein the vacant occupancy status comprising a rented room that is un-occupied.

34. The method of claim 31 wherein the determining the vacant occupancy status comprises tracking actuation of a door switch associated with a door of the room.

35. The method of claim 31 wherein the determining the vacant occupancy status comprises detecting motion within the room.

36. The method of claim 31 wherein the gateway device is associated with at least one of a light switch, a thermostat, a mini-bar, a telephone, a door lock, and a television set top box.

37. The method of claim 31 wherein the wireless commands are diffused infrared dispersion.

38. The system of claim 37 wherein the vacant occupancy status comprising an un-rented room.

39. The system of claim 37 wherein the vacant occupancy status comprising a rented room that is un-occupied.

40. The system of claim 37 wherein the means for determining the vacant occupancy status comprises a door switch associated with a door of the room.

41. The system of claim 37 wherein the means for determining the vacant occupancy status comprises a motion detector located inside of the room.

42. The system of claim 37 wherein the gateway device is associated with at least one of a light switch, a thermostat, a mini-bar, a telephone, a door lock, and a television set top box.

43. The system of claim 37 wherein the wireless commands are diffused infrared dispersion.

44. A system for effecting a reduction of energy usage in a room of a multi-unit building, comprising:

means for determining a vacant occupancy status of a room to generate digital commands in response to the vacant occupancy status of a room;

a gateway device located inside of the room for converting the digital commands into wireless commands and transmitting the wireless commands within the room;

a window treatment control device located inside of the room, the window treatment control device including means for receiving the wireless commands and converting the wireless commands into electronic commands which are processed to set the window treatment to effect a reduction of energy usage;

wherein the gateway device is connected to a network of the multi-unit building and the digital commands are provided by the network.

45. A method of effecting a reduction of energy usage in a room of a multi-unit building, comprising:

determining a vacant occupancy status of a room;

generating digital commands in response to the vacant occupancy status of a room;

converting the digital commands at a gateway device located inside of the room into wireless commands;

transmitting the wireless commands from the gateway device;

receiving the wireless commands at a light switch located inside of the room; and converting the wireless commands into electronic commands which are processed to turn the light switch off;

wherein the gateway device is connected to a network of the multi-unit building and the digital commands are provided by the network.

46. The method of claim 45 wherein the vacant occupancy status comprising an un-rented room.

47. The method of claim 45 wherein the vacant occupancy status comprising a rented room that is un-occupied.

48. The method of claim 45 wherein the determining the vacant occupancy status comprises tracking actuation of a door switch associated with a door of the room.

49. The method of claim 45 wherein the determining the vacant occupancy status comprises detecting motion within the room.

50. The method of claim 45 wherein the gateway device is associated with at least one of the light switch, a thermostat, a mini-bar, a telephone, a door lock, and a television set top box.

51. The method of claim 45 wherein the wireless commands are diffused infrared dispersion.

52. A system for effecting a reduction of energy usage in a room of a multi-unit building, comprising:

means for determining a vacant occupancy status of a room to generate digital commands in response to the vacant occupancy status of a room;

a gateway device located inside of the room for converting the digital commands into wireless commands and transmitting the wireless commands within the room;

a light switch located inside of the room, the light switch including means for receiving the wireless commands and converting the wireless commands into electronic commands which are processed to turn the light switch off;

wherein the gateway device is connected to a network of the multi-unit building and the digital commands are provided by the network.

53. The system of claim 52 wherein the vacant occupancy status comprising an un-rented room.

54. The system of claim 52 wherein the vacant occupancy status comprising a rented room that is un-occupied.

55. The system of claim 52 wherein the means for determining the vacant occupancy status comprises a door switch associated with a door of the room.

56. The system of claim 52 wherein the means for determining the vacant occupancy status comprises a motion detector located inside of the room.

57. The system of claim 52 wherein the gateway device is associated with at least one of the light switch, a thermostat, a mini-bar, a telephone, a door lock, and a television set top box.

58. The system of claim 52 wherein the wireless commands are diffused infrared dispersion.

59. A method of managing energy usage in a room of a multi-unit building, comprising:

determining a rented or un-rented status of the room at a server remote from the room;

generating digital commands at the server in response to the rented or un-rented status of the room;

transmitting the digital commands over a network to a gateway device located inside the room;

converting the digital commands at the gateway device into wireless commands;

transmitting the wireless commands from the gateway device;

receiving the wireless commands at a room environment control device located inside of the room; and converting the wireless commands into electronic commands which are processed by the room environmental control device to effect an increase or a reduction of energy usage by a room environmental device associated with the room environmental control device.

* * * * *